(12) United States Patent
Akiyama

(10) Patent No.: US 7,602,690 B2
(45) Date of Patent: Oct. 13, 2009

(54) ABERRATION ADJUSTMENT DEVICE, METHOD THEREOF, OPTICAL PICKUP, AND OPTICAL INFORMATION RECORDING APPARATUS

(75) Inventor: Hiroshi Akiyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/937,600

(22) Filed: Sep. 10, 2004

(65) Prior Publication Data

US 2005/0063260 A1 Mar. 24, 2005

Related U.S. Application Data

(63) Continuation of application No. PCT/JP2004/003415, filed on Mar. 15, 2004.

(30) Foreign Application Priority Data

| Sep. 19, 2003 | (JP) | ............................. 2003-328756 |
| Oct. 28, 2003 | (JP) | ............................. 2003-367838 |
| Nov. 20, 2003 | (JP) | ............................. 2003-390765 |

(51) Int. Cl.
*G11B 7/00* (2006.01)
(52) U.S. Cl. ............................. 369/112.03; 369/112.02; 369/112.27; 369/44.26; 369/44.32
(58) Field of Classification Search ............... 369/44.26
See application file for complete search history.

(56) References Cited

U.S. PATENT DOCUMENTS

| 5,222,057 | A | * | 6/1993 | Suzuki et al. ............ 369/44.26 |
| 5,488,599 | A | | 1/1996 | Akiyama et al. |
| 5,572,323 | A | | 11/1996 | Maeda et al. |
| 5,694,385 | A | | 12/1997 | Takahashi et al. |
| 5,870,370 | A | | 2/1999 | Takahashi et al. |
| 5,995,292 | A | * | 11/1999 | McDonald .................. 359/637 |
| 6,122,241 | A | | 9/2000 | Akiyama et al. |
| 6,195,315 | B1 | | 2/2001 | Takahashi et al. |
| 6,240,053 | B1 | | 5/2001 | Akiyama |
| 6,272,098 | B1 | | 8/2001 | Takahashi et al. |
| 6,343,058 | B1 | | 1/2002 | Akiyama et al. |
| 6,480,455 | B2 | | 11/2002 | Takahashi |

(Continued)

FOREIGN PATENT DOCUMENTS

EP 1 205 923 A2 5/2002

(Continued)

OTHER PUBLICATIONS

European Search Report dated Jul. 2, 2008.

*Primary Examiner*—Muhammad N. Edun
(74) *Attorney, Agent, or Firm*—Dickstein Shapiro LLP

(57) ABSTRACT

A method for adjusting an aberration is disclosed that adjusts the aberration existing in a light spot by using a control signal generated from a wobbling signal and a reproduction signal, and thereby maintaining an appropriate S/N ratio for both the wobbling signal and the reproduction signal even when astigmatism, spherical aberration, or other aberrations are present. In an optical pickup, by moving a collimator lens along a light path, a spherical aberration is generated on the light emitted from a light source, a reproduction signal (RF signal) is obtained from the light reflected from an optical disk, a wobbling signal is obtained from the light reflected from grooves on the optical disk, and the correction aberration is adjusted based on the RF signal and the wobbling signal.

24 Claims, 29 Drawing Sheets

U.S. PATENT DOCUMENTS

| | | | |
|---|---|---|---|
| 6,545,958 B1 | 4/2003 | Hirai et al. | |
| 6,549,493 B1 * | 4/2003 | Nakamura et al. | 369/44.32 |
| 6,563,780 B2 * | 5/2003 | Kim et al. | 369/112.01 |
| 6,584,060 B1 | 6/2003 | Oohchida et al. | |
| 6,738,332 B2 * | 5/2004 | Sato et al. | 369/53.28 |
| 6,771,584 B2 * | 8/2004 | Yamanaka | 369/112.23 |
| 6,970,405 B2 * | 11/2005 | Tateishi et al. | 369/44.32 |
| 7,068,576 B2 | 6/2006 | Kobayashi | |
| 7,142,484 B2 * | 11/2006 | Ando et al. | 369/44.23 |
| 7,218,750 B1 * | 5/2007 | Hiraishi et al. | 382/100 |
| 2001/0050892 A1 | 12/2001 | Takahashi et al. | |
| 2002/0181367 A1 * | 12/2002 | Ogasawara | 369/53.19 |
| 2003/0007431 A1 * | 1/2003 | Tateishi | 369/44.23 |
| 2003/0048736 A1 | 3/2003 | Takahashi et al. | |
| 2003/0099168 A1 | 5/2003 | Ma et al. | |
| 2003/0151999 A1 | 8/2003 | Hirai et al. | |
| 2003/0193876 A1 | 10/2003 | Oohchida et al. | |
| 2004/0184383 A1 | 9/2004 | Nakayama | |

FOREIGN PATENT DOCUMENTS

| | | |
|---|---|---|
| EP | 1-318-507 | 6/2003 |
| JP | 08-045081 | 2/1966 |
| JP | 11-353681 | 12/1999 |
| JP | 2000-3526 | 1/2000 |
| JP | 2000-339726 | 12/2000 |
| JP | 2000-348371 | 12/2000 |
| JP | 2001-176108 | 6/2001 |
| JP | 2002-150588 | 5/2002 |
| JP | 2003-168225 | 6/2003 |
| JP | 2003-346369 | 12/2003 |

* cited by examiner

PRIOR ART

PRIOR ART

PHASE MODULATED PORTION

◆ : RADIAL   ■ : TANGENTIAL

◆ : RADIAL   ■ : TANGENTIAL

ABERRATION ADJUSTMENT DEVICE, METHOD THEREOF, OPTICAL PICKUP, AND OPTICAL INFORMATION RECORDING APPARATUS

CROSS-REFERENCE TO RELATED APPLICATION

This application is a U.S. continuation application filed under 35 USC 111(a) claiming benefit under 35 USC 120 and 365(c) of PCT application JP2004/003415, filed on Mar. 15, 2004, which claims priority to Japanese patent applications No. 2003-328756 filed on Sep. 19, 2003, No. 2003-367838 filed on Oct. 28, 2003, No. 2003-390765 filed on Nov. 20, 2003. The foregoing applications are hereby incorporated herein by reference.

BACKGROUND OF THE INVENTION

1. Field of the Invention

The present invention relates to an aberration adjustment device and methods thereof, an optical pickup, and an optical recording apparatus preferably for recording or reproducing data in DVD or other optical information recording media.

2. Description of the Related Art

Japanese Laid-Open Patent Application No. 2000-348371 discloses a technique of controlling astigmatism in real-time according to a wobbling signal, and adjusting a light spot on an optical disk.

FIG. 1 is a schematic view showing a configuration of an optical disk.

As illustrated in FIG. 1, on an optical disk for use of recording, wobbles 110 and land pre-pits (LPP) 111 are formed to represent synchronization information (synchronization patterns) and address information on the disk. In FIG. 1, the reference 112 represents grooves, 113 represents lands, and 114 represents pits. Because of the presence of the wobbles 110 and land pre-pits (LPP) 111, the structure on the optical disk is microscopically asymmetric in the radial direction. On the other hand, because the track grooves are periodical in units of track pitches, from this point of view, the structure on the optical disk is a symmetric one.

The wobbling signal or the LPP signal is related to the asymmetric aspect of the structure on the optical disk, and the so-called push-pull signal, or other track signals, is related to the symmetric aspect of the structure on the optical disk, which has a relatively low frequency.

FIG. 2 is a plan view showing a state of light received by a light reception element of an optical disk drive.

As illustrated in FIG. 2, the track pattern 103 of reflected light is divided into two parts, that is, a part 104 corresponding to a light reception region A of a light reception element, and a part 105 corresponding to a light reception region B of the light reception element. The wobbling signal or the LPP signal is generated based on a differential signal between a signal corresponding to light of the part 104 and a signal corresponding to light of the part 105. The wobbling signal or the LPP signal is superposed on the push-pull signal related to the track grooves in a high frequency region.

Therefore, if the size of the spot on the recording surface is large in the radial direction (that is, in the direction crossing the tracks), the MTF (Modulation Transfer Function) in this direction declines, and this degrades the ratio C/N (power of carrier/power of noise) of signals obtained from the grooves, that is, the wobbling signal and the LPP signal.

In addition, if astigmatism is present in the light condensed on the recording surface of the optical disk, the front wave of the light becomes a saddle shape, and the spot of such light has different focus positions where the size of the spot is minimum in the direction along which the saddle curves. Therefore, when the light spot is focused in the radial direction, the ratio C/N of signals obtained from the grooves increases.

On the other hand, a sufficiently high MTF is necessary for an information signal along the grooves (that is, in a tangential direction). When astigmatism is present, the light spot seems good if the spot is focused in the tangential direction, but at the same time, the spot size in the radial direction increases, and the signal quality is degraded because of influences of cross-talk between adjacent tracks. Empirically, the position where the amplitude of the RF signal becomes a maximum is the optimum focus position for the information signal. This focus position, however, is different from the focus position where the spot size is in the radial direction.

That is to say, if the astigmatism is present in the light spot, the focus position resulting in an optimum wobbling signal or LPP signal obtained from the grooves is different from the focus position resulting in an optimum information signal.

The astigmatism is generated from optical parts in an optical pickup including the laser diode (LD), and it may change with temperature, hence, troubles due to temperature may occur under different conditions.

Although the technique of controlling astigmatism in real-time according to the wobbling signal and adjusting the light spot on the optical disk is disclosed in the Japanese Laid-Open Patent Application No. 2000-348371, because this technique is based only on the wobbling signal, the aforesaid problems can not be solved.

SUMMARY OF THE INVENTION

It is a general object of the present invention to solve one or more problems of the related art.

A specific object of the present invention is to provide a method that changes a characteristic of a light spot of a light beam emitted onto an optical recording medium by using a control signal generated from a signal obtained from grooves on the optical recording medium and an information signal so that an appropriate value of a signal to noise ratio is maintained for the signal obtained from the grooves and the information signal even when astigmatism or other aberrations exist in the light spot.

According to a first aspect of the present invention, there is provided an aberration adjustment device including an aberration generation unit (or element) configured to generate a correction aberration on light emitted from a light source; a reproduction signal extraction unit (or element) configured to extract a reproduction signal from light reflected from an optical information recording medium having a guiding groove; a groove shape signal extraction unit (or element) configured to extract a groove shape signal corresponding to a shape of the guiding groove from light reflected from the optical information recording medium; and an aberration adjustment unit (or element) configured to adjust the correction aberration generated by the aberration generation unit based on the reproduction signal and the groove shape signal.

According to a second aspect of the present invention, there is provided an optical pickup that has an aberration adjustment device for adjusting an aberration related to light emitted from a light source, and records or reproduces data in an optical information recording medium having a guiding groove by using the light adjusted by the aberration adjustment device. The aberration adjustment device includes an aberration generation unit configured to generate a correction aberration on the light emitted from the light source; a reproduction signal extraction unit configured to extract a reproduction signal from light reflected from the optical information recording medium; a groove shape signal extraction unit configured to extract a groove shape signal corresponding to a shape of the guiding groove from light reflected from the optical information recording medium; and an aberration adjustment unit configured to adjust the correction aberration generated by the aberration generation unit based on the reproduction signal and the groove shape signal.

According to a third aspect of the present invention, there is provided a program executable in a computer for executing an optical information recording apparatus so as to adjust an aberration related to light emitted from a light source and record or reproduce data in an optical information recording medium having a guiding groove by using the aberration-adjusted light. The program executes the optical information recording apparatus to operate an aberration generation unit configured to generate a correction aberration on the light emitted from the light source; a reproduction signal extraction unit configured to extract a reproduction signal from light reflected from the optical information recording medium; a groove shape signal extraction unit configured to extract a groove shape signal corresponding to a shape of the guiding groove from light reflected from the optical information recording medium; and an aberration adjustment unit configured to adjust the correction aberration generated by the aberration generation unit based on the reproduction signal and the groove shape signal.

According to a fourth aspect of the present invention, there is provided a method device for adjusting an aberration related to light emitted from a light source. The method includes the steps of generating a correction aberration on light emitted from a light source; extracting a reproduction signal from light reflected from an optical information recording medium having a guiding groove; extracting a groove shape signal corresponding to a shape of the guiding groove from light reflected from the optical information recording medium; and adjusting the correction aberration based on the reproduction signal and the groove shape signal.

These and other objects, features, and advantages of the present invention will become more apparent from the following detailed description of preferred embodiments given with reference to the accompanying drawings.

DESCRIPTION OF THE PREFERRED EMBODIMENTS

Below, preferred embodiments of the present invention are explained with reference to the accompanying drawings.

First, the optical disk used as an optical information recording medium in the present embodiment is introduced briefly.

Optical disks like DVD-RAM (WO), DVD-R, DVD+R, DVD-RAM, DVD-RW, DVD+RW, and so on, are recordable DVDs (Digital Versatile Disc). Among these optical disks, DVD-RAM (WO), DVD-R, and DVD+R are write-once DVDs, that is, these DVDs can be recorded only once, and DVD-RAM, DVD-RW, and DVD+RW are disks that can be recorded multiple times. The optical disks DVD+R, and DVD+RW can be recorded or reproduced by an optical disk drive 1 as described below. Of course, the optical disk drive 1 is capable of reproducing a read-only disk like a DVD-ROM, a DVD-Video, and a DVD-Audio.

First Embodiment

Figure 3:
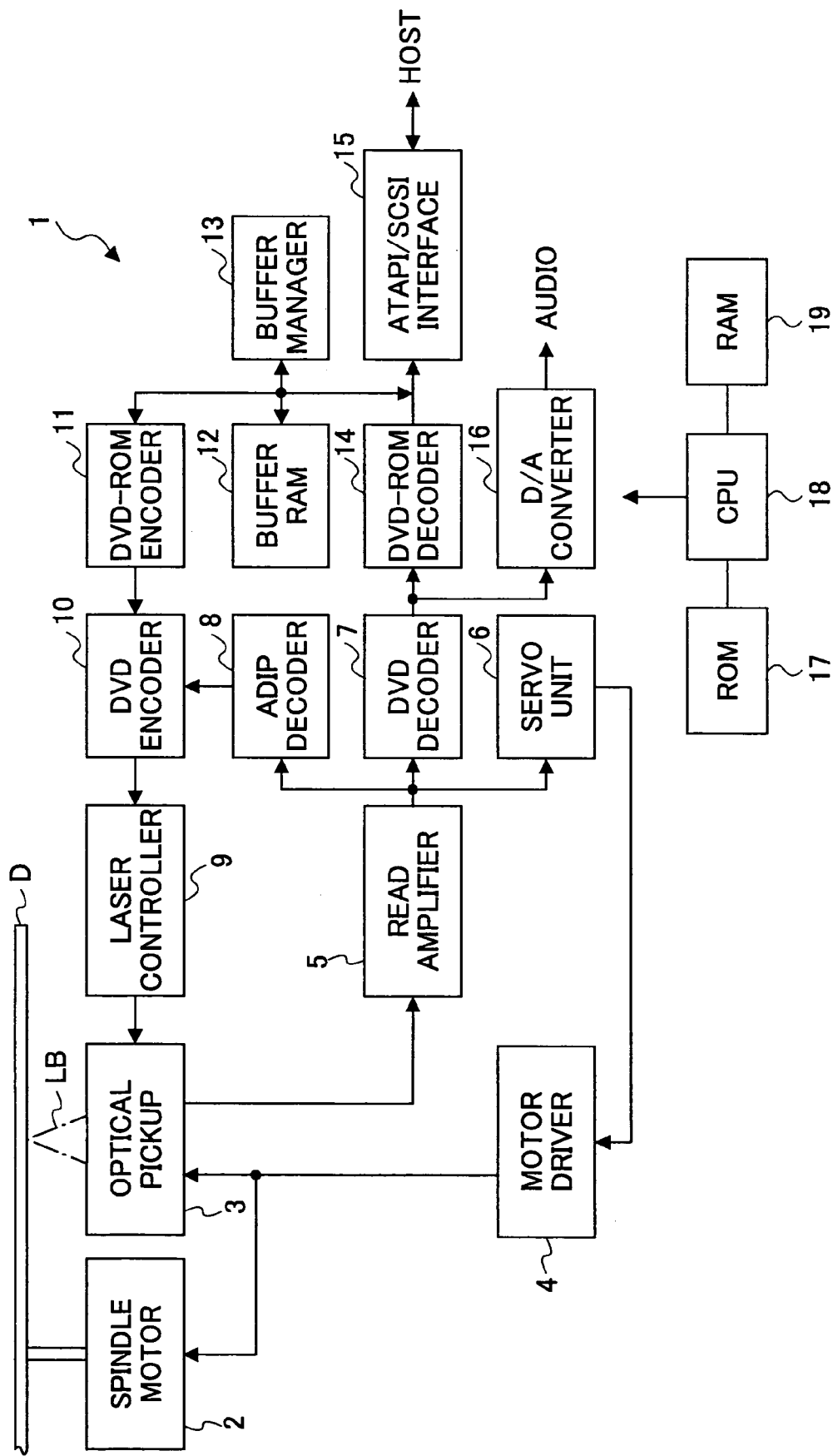
FIG. 3 is a block diagram schematically showing a configuration of an optical disk drive 1 according to a first embodiment of the present invention.

FIG. 3 is a block diagram schematically showing a configuration of an optical disk drive 1 according to a first embodiment of the present invention. In the present embodiment, descriptions are mainly made of corrections to aberrations, for example, spherical aberrations.

The optical disk drive 1 illustrated in FIG. 3 includes a spindle motor 2, an optical pickup 3, a motor driver 4, a read amplifier 5, a servo unit 6 for controlling the motor driver 4, a DVD decoder 7, an ADIP decoder 8, a laser controller 9, a DVD encoder 10, a DVD-ROM encoder 11, a buffer RAM 12, a buffer manager 13, a DVD-ROM decoder 14, an ATAPI/SCSI interface 15, a D/A converter 16, a ROM 17, a CPU 18, and a RAM 19.

As illustrated in FIG. 3, the optical pickup 3 of the optical disk drive 1 emits a laser beam LB to record or reproduce data in an optical disk D. The D/A converter 16 outputs an audio signal indicated by AUDIO.

In FIG. 3, the arrows indicate flows of typical signals and data as will be appreciated, and for simplicity of illustration, connections between the CPU 18 and the above elements, which are controlled by the CPU 18, are omitted.

The ROM 17 stores control programs including codes readable by the CPU 18. When the power of the optical disk drive 1 is turned ON, the control programs are loaded in a not-illustrated main memory, and the CPU 18 controls operations of the above elements according to the loaded programs, and stores data for control in the RAM 19.

Below, an explanation is given of the configuration and operation of the optical disk drive 1.

The optical disk D is driven by the spindle motor 2 to rotate.

The spindle motor 2 is driven by the motor driver 4 and the servo unit 6 so as to rotate at a constant linear speed or angular speed. The linear speed or angular speed may be changed step-by-step.

The optical pickup 3 includes a semiconductor laser, an optical system, a focus actuator, a track actuator, a light reception element, and a position sensor as will be appreciated. The optical pickup 3 emits a laser beam LB onto a recording surface of the optical disk D. Driven by a seek motor, the optical pickup 3 can move in a storage direction.

The focus actuator, the track actuator, and the seek motor are controlled by the motor driver 4 and the servo unit 6 based on signals obtained from the light reception element and the position sensor, so that the light spot of the laser beam LB is located at a desired position on the optical disk D. The detailed configuration of the optical pickup 3 is described below.

When reading information from the optical disk D, a reproduction signal, which is output from the optical pickup 3, is amplified and digitalized in the read amplifier 5, and is input to the DVD decoder 7. The digitalized data is demodulated in the DVD decoder 7 according to the 8/16 demodulation scheme. Here, the recorded data are modulated in units of eight bits, and in this modulation, each of the eight-bit data is converted into 16-bit data. In this case, when converting an eight-bit data into a 16-bit data, the merging bits are added so that the resulting number of the "1" bits is equal to the number of the "0" bits on average. This is the so-called "DC component depression", for suppressing a shift of a slice level of a reproduction signal after cutting the DC component.

The demodulated data are further subjected to processing of de-interleaving and error correction. Then, the resulting data are input to the DVD-ROM decoder 14, and error correction is performed again on the data so as to improve the reliability. The thus obtained data, that is, the data on which error correction has been performed twice, are temporarily stored in the buffer RAM 12 by the buffer manager 13. When the bit number of the data becomes the bit number of a sector of the buffer RAM 12, the sector of data is transmitted to a host computer (that is, an information processing apparatus 21 as described below) via the ATAPI/SCSI interface 15 at one time.

If the reproduction data are music data, the data output from the DVD decoder 7 are input to the D/A converter 16, and are output from D/A converter 16 as the analog audio signal AUDIO.

When recording information in the optical disk D, the recording data, that is, the data to be recorded, are transmitted from a not-illustrated host computer (that is, the information processing apparatus 21 as described below) via the ATAPI/SCSI interface 15, and are temporarily stored in the buffer RAM 12 by the buffer manager 13, and then, the recording operation is started.

Before starting the recording operation, the light spot of the laser beam is located at a recording starting position. In the DVD+RW or the DVD+R, the recording starting position is determined from a wobbling signal, which is generated from the wobbling shape of the tracks formed on the optical disk D in advance.

In the DVD-RW or the DVD-R, instead of the wobbling signal, the recording starting position is determined from the land pre-pits. In the DVD-RAM or the DVD-RAM (WO), the recording starting position is determined from the pre-pit.

The wobbling signal used in the DVD+RW or the DVD+R, includes address information referred to as ADIP (ADdress In Pre-groove), and this address information is extracted by the ADIP decoder 8. A synchronization signal generated by the ADIP decoder 8 is input to the DVD encoder 10, enabling data recording at an accurate position on the optical disk D.

The data from the buffer RAM 12 are further processed in the DVD-ROM encoder 11, the DVD encoder 10, or others, error correction codes are added, and interleaving processing is performed. Then, the resulting data are recorded on the optical disk D via the laser controller 9 and the optical pickup 3. It should be noted that the address information may also be obtained from the land pre-pits or the pre-pits.

Figure 4:
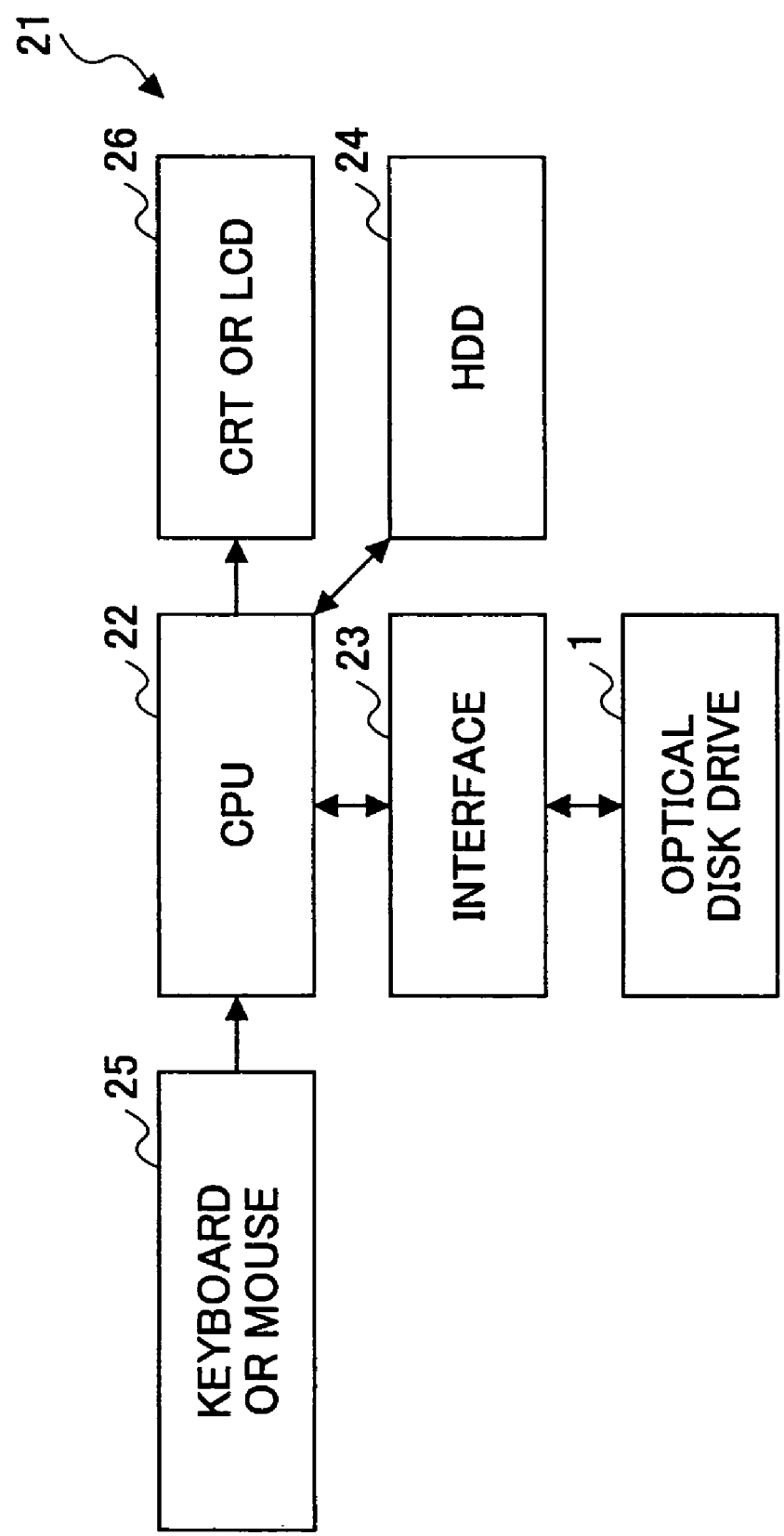
FIG. 4 is a block diagram schematically showing a configuration of an information processing apparatus 21 for the optical disk drive 1.

FIG. 4 is a block diagram schematically showing a configuration of an information processing apparatus 21 for processing signals from the optical disk drive 1. The information processing apparatus 21 acts as the aforesaid host computer.

As illustrated in FIG. 4, the information processing apparatus 21 includes a controller 22, an interface 23, a storage unit 24 for storing data, an input device 25 such as a keyboard, or a mouse, and a display unit 26.

For example, the controller 22 includes a microcomputer, a main memory (not-illustrated), and controls the information processing apparatus 21.

The interface 23 is a communication interface for bi-directional communication between the information processing apparatus 21 and the optical disk drive 1. The interface 23 may be in conformity with an ATAPI (AT Attachment Packet Interface) standard or a SCSI (Small Computer System Interface) standard. The interface 23 is connected with the interface 15 of the optical disk drive 1. The connection between the interfaces may be achieved by cables (cable connection), such as SCSI cables, or by infrared rays (wireless connection).

The storage unit 24, for example, a hard disk HDD, is for storing programs created by using codes readable by microcomputer of the controller 22. When the power of the information processing apparatus 21 is turned ON, the programs are loaded in the main memory of the controller 22.

The display unit 26, for example, may be a CRT (Cathode Ray Tube), or a LCD (Liquid Crystal Display), or a PDP (Plasma Display Panel), and displays various information from the controller 22.

The input device 25, for example, may include at least one of a keyboard, a mouse, and a pointing device, to transmit information input by a user to the controller 22. The information may also be input wirelessly. Further, the input device 25 may be formed integral with the display unit 26, like a CRT with a touch panel.

An OS (Operating System) is installed in the information processing apparatus 21, and the OS controls the elements of the information processing apparatus 21.

Figure 5:
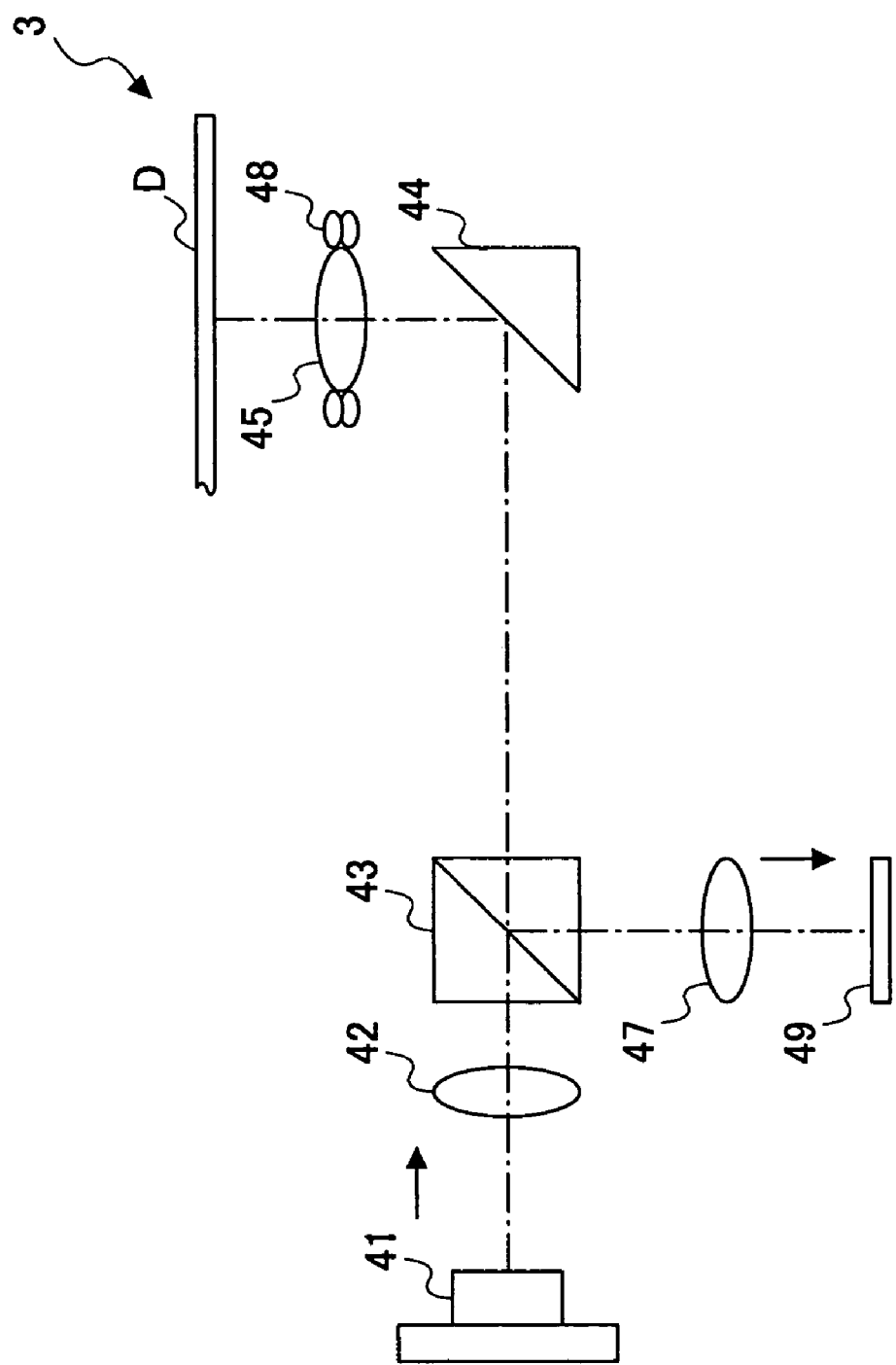
FIG. 5 is a diagram showing an example of a configuration of the optical pickup 3.

FIG. 5 is a diagram showing an example of a configuration of the optical pickup 3.

As illustrated in FIG. 5, the optical pickup 3 includes a light source 41, a collimator lens 42, a beam splitter 43, a light deflecting prism 44, an object lens 45, a condensing lens 47, a photo detector (PD) 49, and an actuator 48.

The light source 41 includes, for example, a semiconductor laser LD that emits a laser beam. The collimator lens 42 converts the laser beam from the light source 41 to a nearly parallel light beam. The beam splitter 43 allows the nearly parallel light beam from the collimator lens 42 to pass through. The light beam passing through the beam splitter 43 is deflected by 45 degrees in the light deflecting prism 44, directed to pass through the object lens 45.

The object lens 45 condenses the incident light beam to form a small light spot on a recording surface of the optical disk D after the condensed light beam passes through a transparent substrate of the optical disk D. This light spot is used for reproducing, recording, or erasing data in the optical disk D.

The actuator 48 is used for moving the object lens 45 in a radial direction and a focusing direction. For example, the actuator 48 has a well known configuration including tracking coils, focus coils, and permanent magnets.

In addition, a light beam reflected on the recording surface of the optical disk D, that is a returning light beam, is converted into a nearly parallel light beam in the object lens 45, reflected by the beam splitter 43, and is condensed by the condensing lens 47 on to the detection surface of the photo detector (PD) 49. From the photo detector (PD) 49, the information signal and servo signals are detected.

Figure 1:
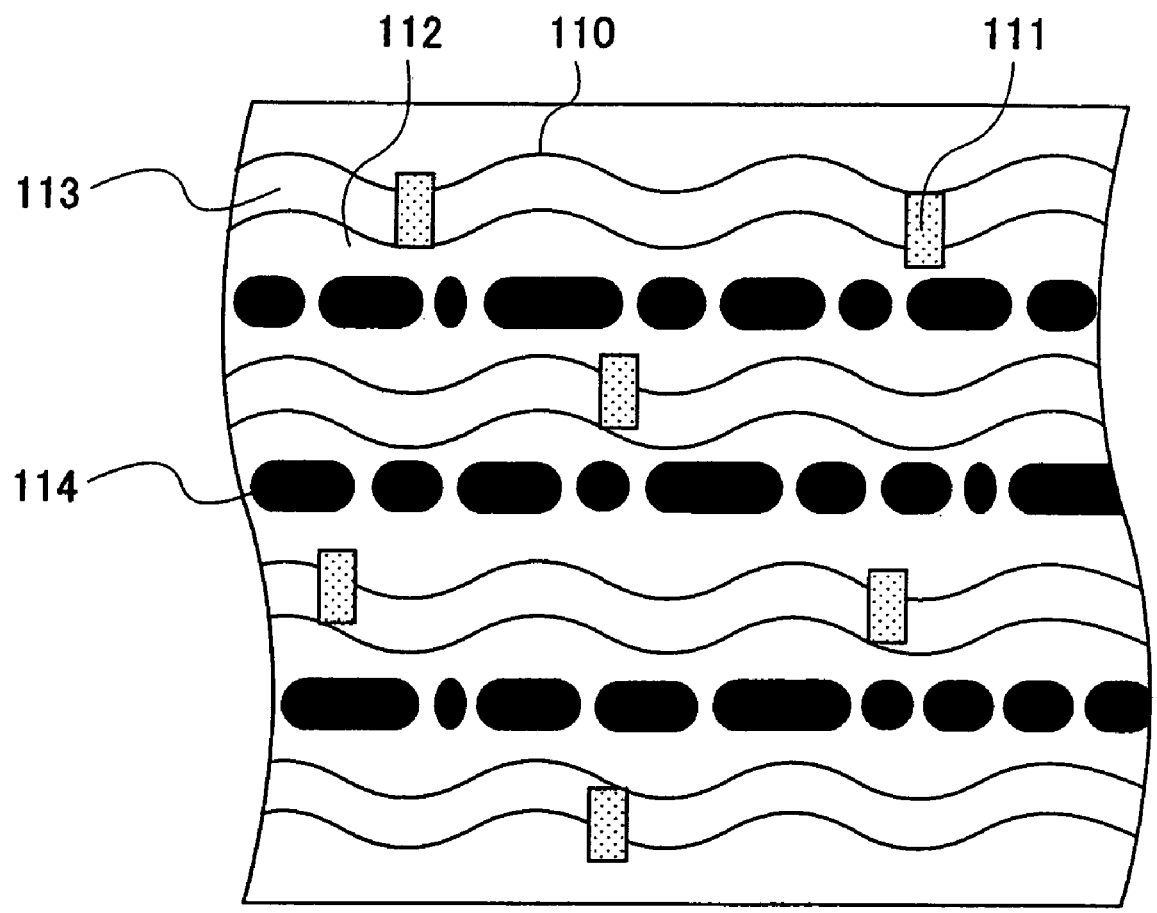
FIG. 1 is a schematic view showing a configuration of an optical disk.
Figure 2:
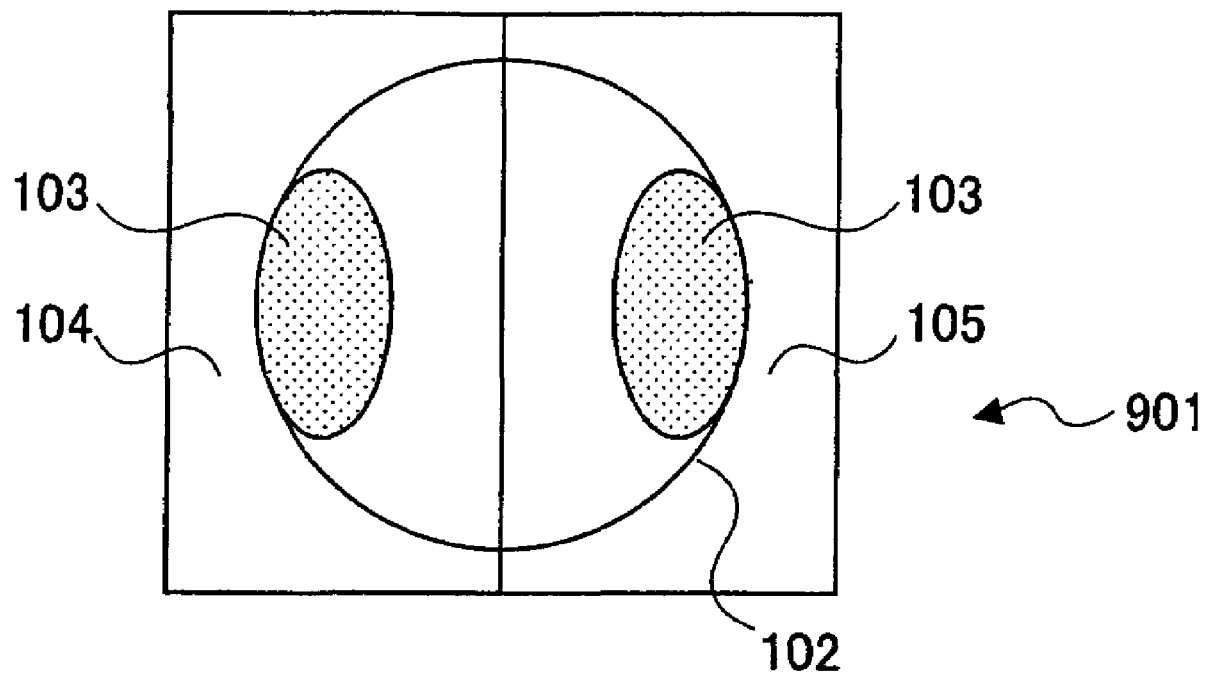
FIG. 2 is a plan view showing a state of light received by a light reception element of an optical disk drive.

As illustrated in FIG. 2, the detection surface of the photo detector PD 49 is divided into at least two divisions, and the wobbling signal or the LPP signal is generated from the differential signal related to the two divisions, that is, the push-pull signal (PP signal). The wobbling signal or the LPP signal is the information component related to the asymmetric aspect of the grooves of the structure on the optical disk D in the radial direction (that is, in the direction crossing the tracks).

Figure 6A:
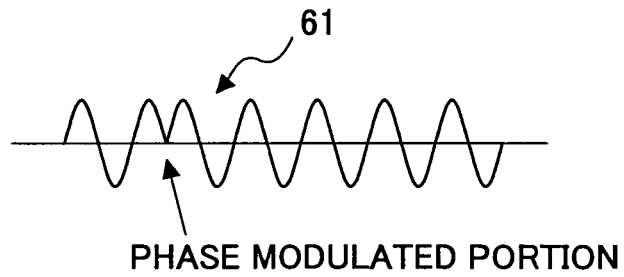
FIG. 6A is a wave-form of a wobbling signal 61.
Figure 6B:
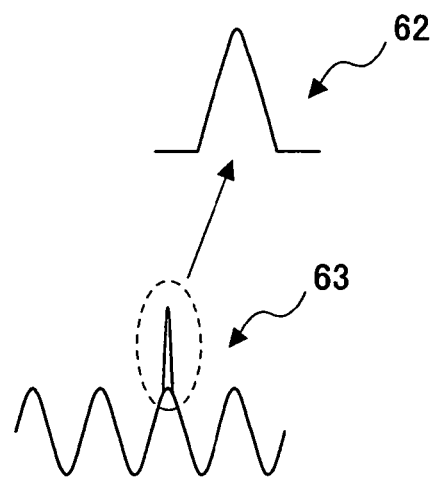
FIG. 6B is a wave-form of a LPP signal 62.

FIG. 6A is a wave-form of a wobbling signal 61, and FIG. 6B is a wave-form of a LPP signal 62.

With a band-pass filter, a RF component and a push-pull component can be eliminated from the push-pull signal. FIG. 6A shows an example of the wobbling signal related to tracks (grooves), which are formed so that address information is recorded in the tracks by phase modulation used in a DVD+RW or DVD+R. On the other hand, FIG. 6B shows an example of the extracted LPP signal in which address information is recorded by the LPP scheme used in a DVD-RW or DVD-R. Actually, the LPP signal is detected while being superposed on the wobbling signal, as indicated by the reference number 63.

Figure 7:
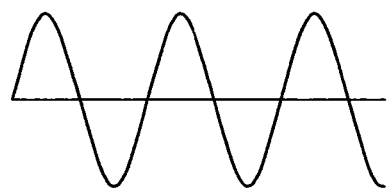
FIG. 7 is a wave-form of a push-pull signal.

FIG. 7 is a wave-form of a push-pull signal.

If using a low-pass filter to cut a high-frequency component in the signal illustrated in FIG. 6B, a push-pull signal used for groove tracking, as illustrated in FIG. 7, can be obtained.

Ideally, in the optical pickup 3, when a focus signal is zero, the amplitude of the RF signal becomes a maximum, and an error rate of the information signal becomes a minimum, resulting in optimum quality of signals obtained from the wobbling signal or the LPP signal.

Figure 8:
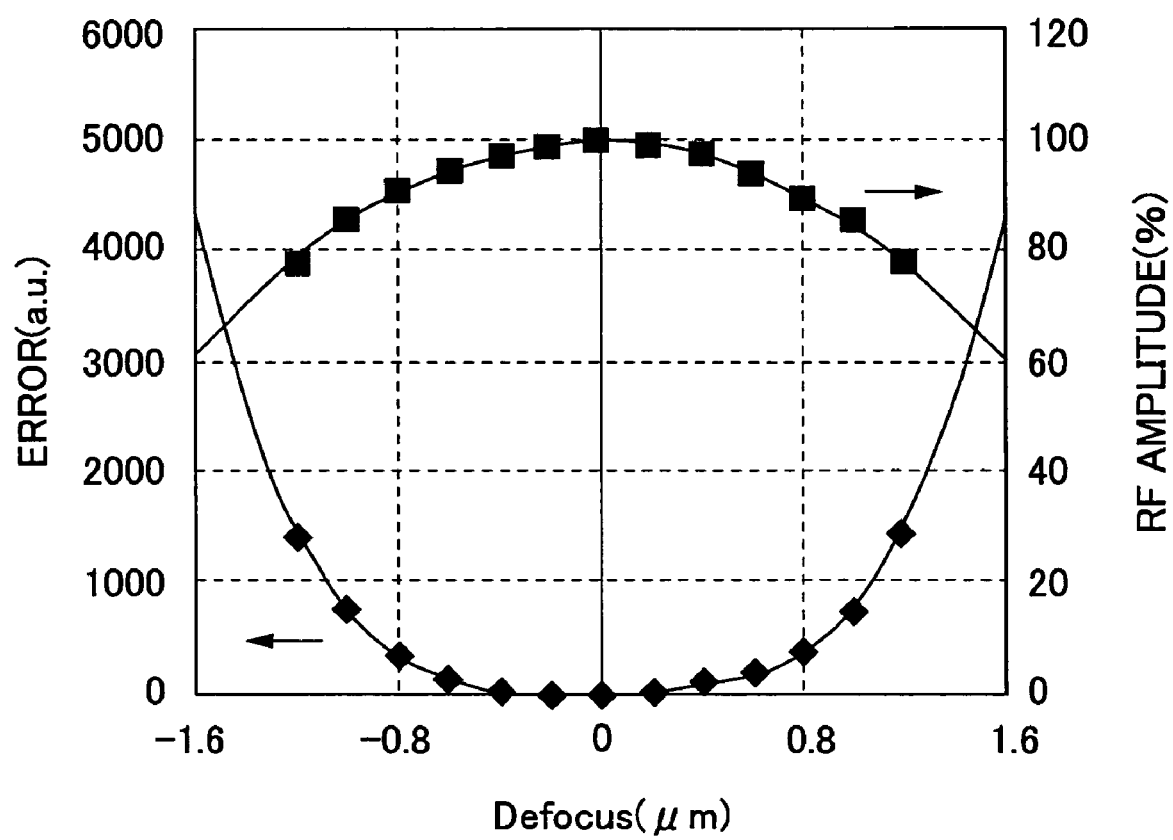
FIG. 8 shows graphs illustrating a method of measuring a maximum of the RF signal.

FIG. 8 shows graphs illustrating a method of measuring a maximum of the RF signal.

Following the above description with reference to FIG. 7, a focus control may be performed to measure the amplitude of the RF signal by using an internal circuit while changing a focus position within a range from −0.5 μm to +0.5 μm relative to the original focus position, perform approximating calculations to find the focus position where the amplitude of the RF signal becomes a maximum by using an internal CPU, and add an offset to the focus signal so that the focus position is controlled to correspond to the maximum amplitude of the RF signal constantly.

Figure 9A:
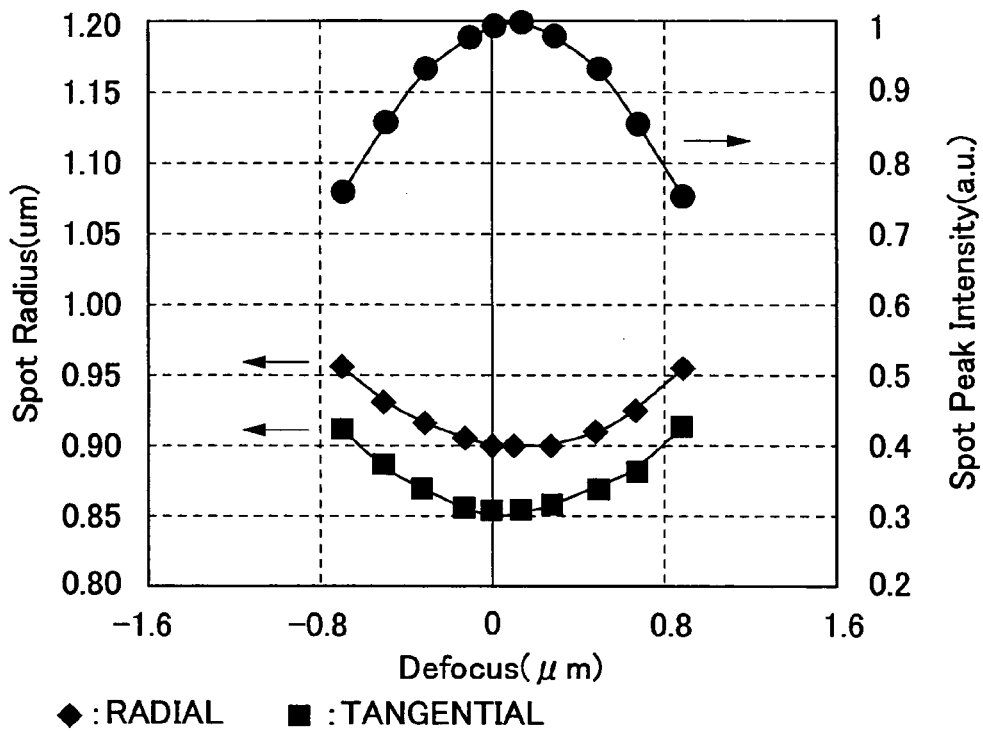
FIGS. 9A and 9B show graphs illustrating a variation of the size of the light spot due to presence of astigmatism.
Figure 9B:
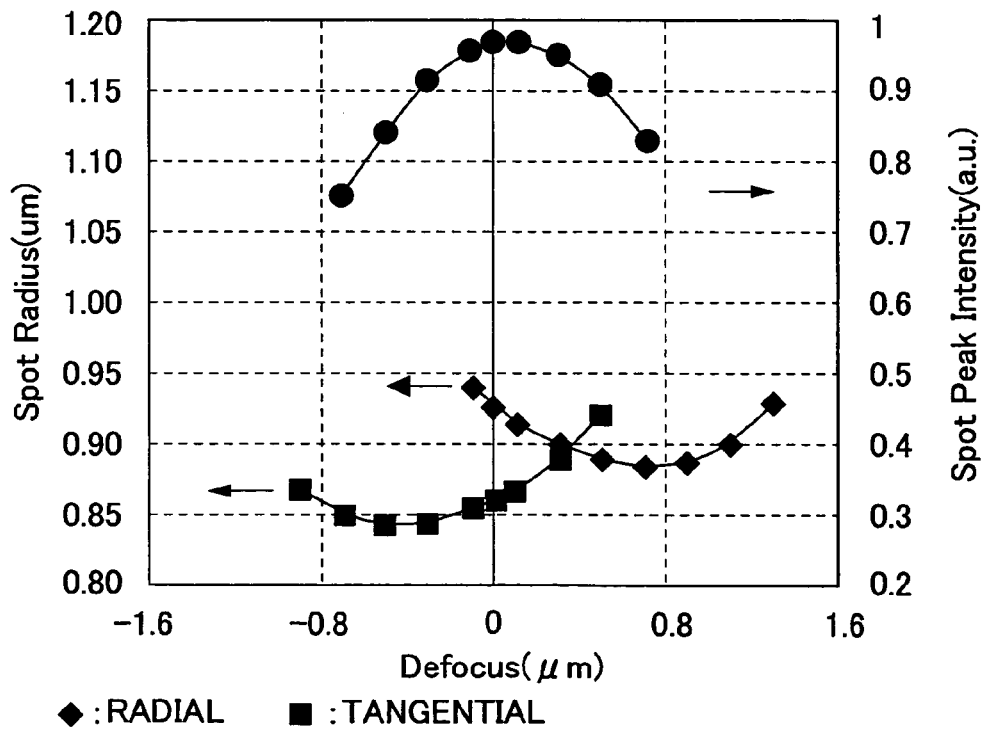

FIGS. 9A and 9B show graphs illustrating changes in the light spot size due to presence of astigmatism.

As illustrated in FIGS. 9A and 9B, however, if the astigmatism is present in the light spot due to uncertainty occurring when assembling optical parts in the optical pickup 3, or due to intrinsic characteristics of the laser diode 41, the focus position where the light spot has a minimum size in the radial direction is different from the focus position where the light spot has a minimum size in the tangential direction. In this case, as illustrated in FIG. 9B, the focus position related to the minimum light spot in the radial direction, and the focus position related to the minimum light spot in the tangential direction are shifted relative to the peak position of the intensity of the light spot.

Figure 10:
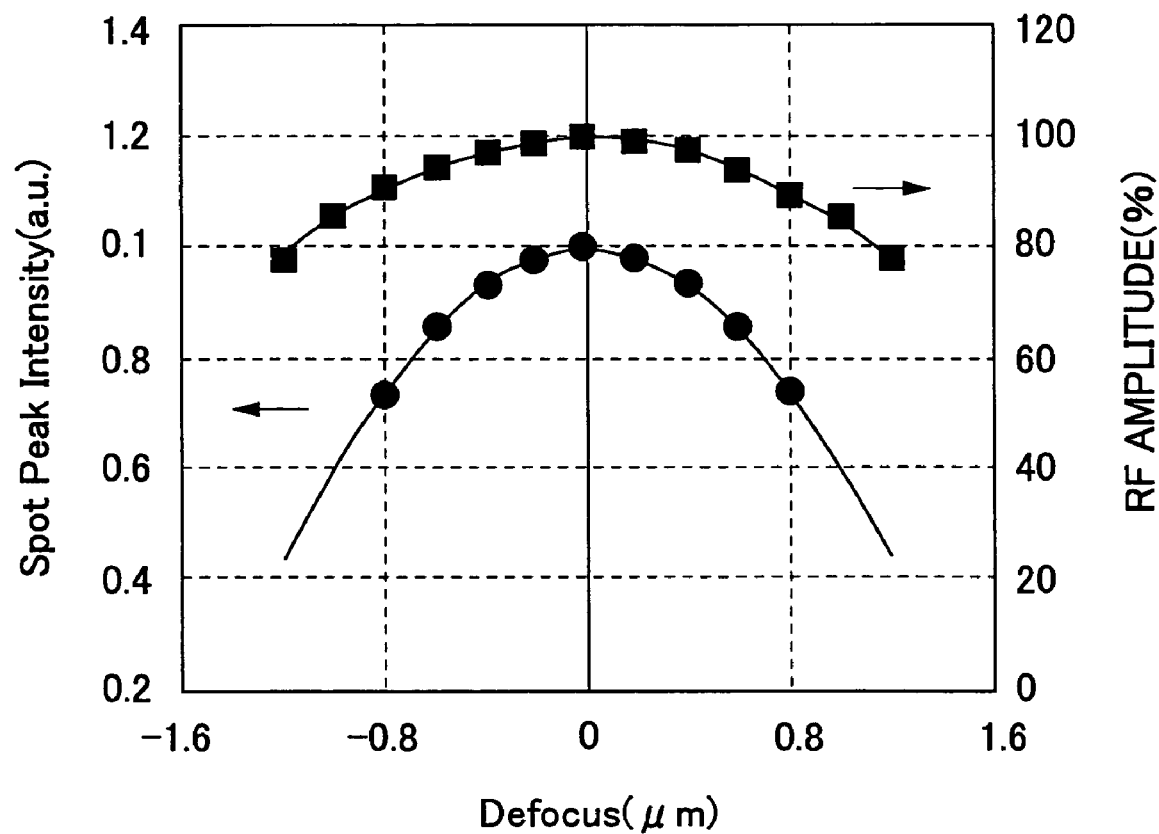
FIG. 10 shows graphs illustrating a characteristic of the RF signal.

FIG. 10 shows graph for illustrating a characteristic of the RF signal.

As illustrated in FIG. 10, the position related to a maximum of the amplitude of the RF signal is not dependent on the astigmatism, and is basically in agreement with the peak position of the intensity of the light spot.

Figure 11:
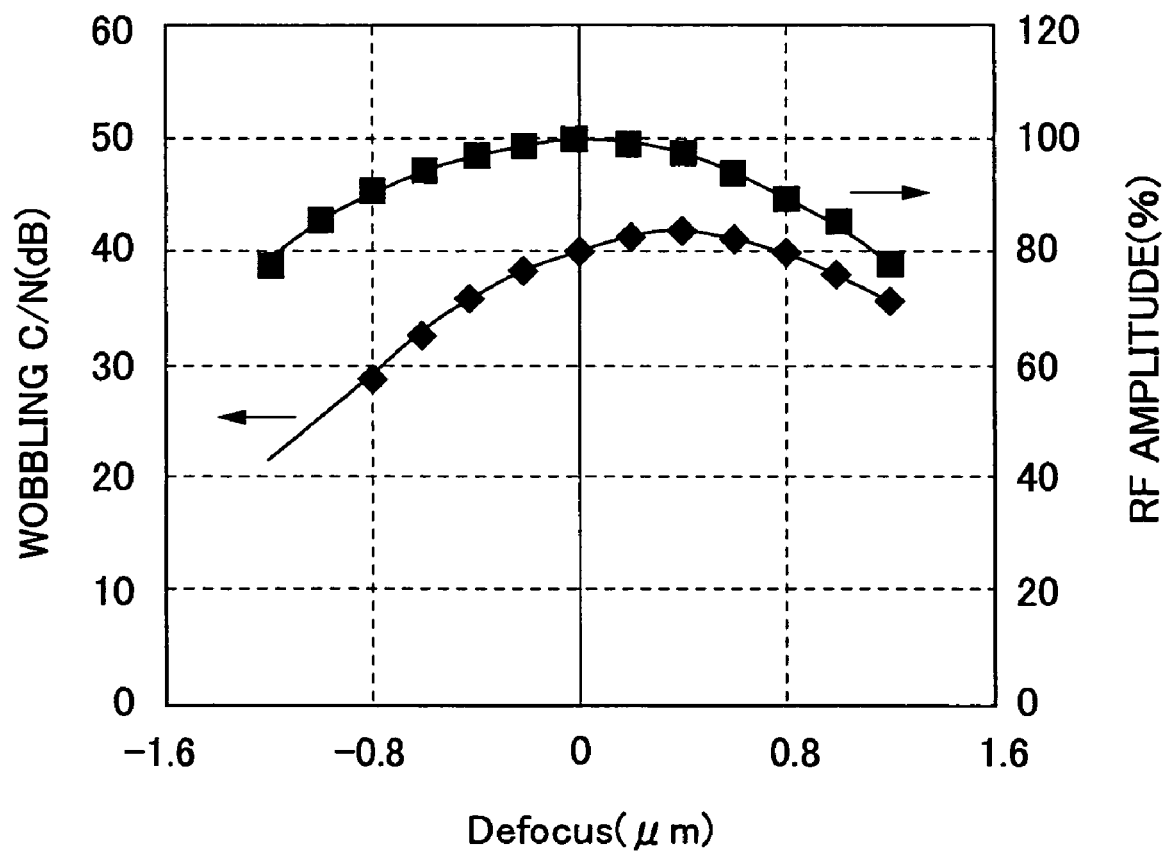
FIG. 11 shows graphs illustrating a relation between the RF signal and quality of the wobbling signal.

FIG. 11 shows graph for illustrating a relation between the RF signal and quality of the wobbling signal.

Generally, an error rate of the information signal becomes a minimum when the amplitude of the RF signal is a maximum, and quality of signals obtained from the wobbling signal or the LPP signal becomes optimum when the light spot size is a minimum in the radial direction. For this reason, quality of signals obtained from the wobbling signal or the LPP signal is probably not sufficiently high even at a focus position where the amplitude of the RF signal is a maximum.

Therefore, when carrying out focus control to appropriately adjust the focus position, if the astigmatism is present, for example, it is not sufficient to adjust the focus position so that the amplitude of the RF signal is a maximum at the focus position. Instead, it is more desirable to find a focus position F1 where the amplitude of the RF signal is a maximum, and a focus position F2 where the amplitude of the wobbling signal is a maximum, and carry out focus control to adjust the focus position to be a mean value F of F1 and F2 (F=(F1+F2)/2).

In this case, however, if the astigmatism is large, there is a risk that quality of both of the RF signal and the wobbling signal can not be guaranteed at the intermediate position F.

The optical disk drive 1 of the present embodiment is configured to solve this problem.

Figure 12A:
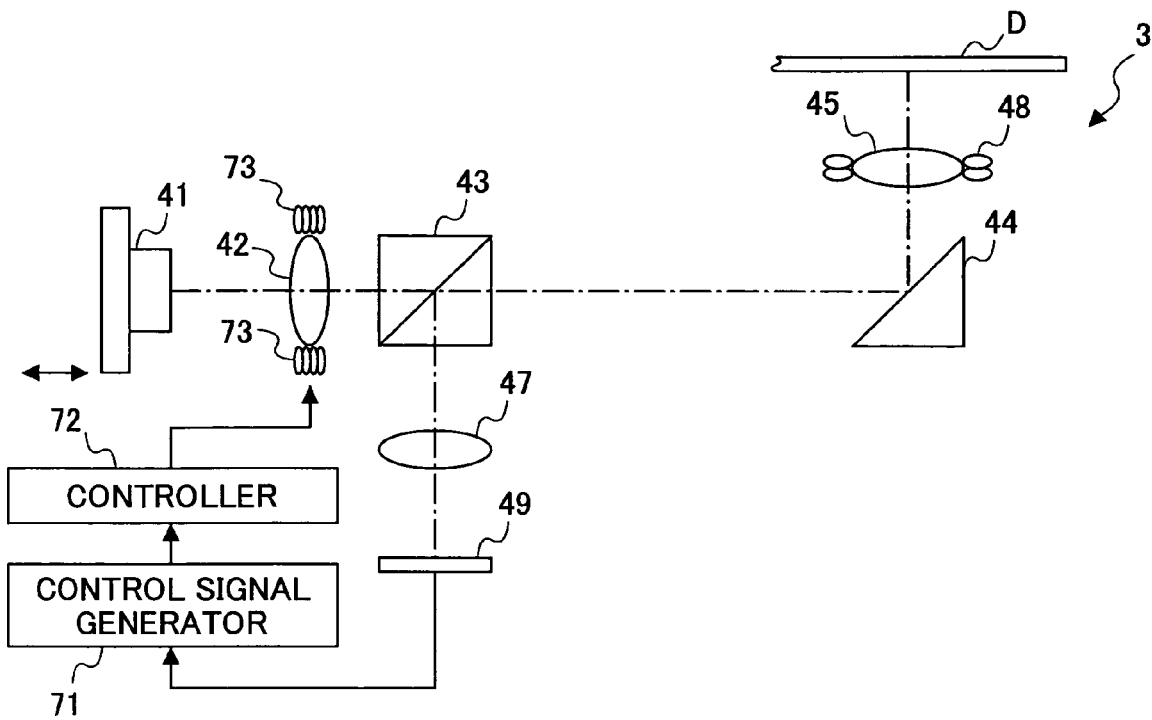
FIGS. 12A and 12B are diagrams schematically showing examples of an optical system of the optical pickup 3 according to the present embodiment.
Figure 12B:
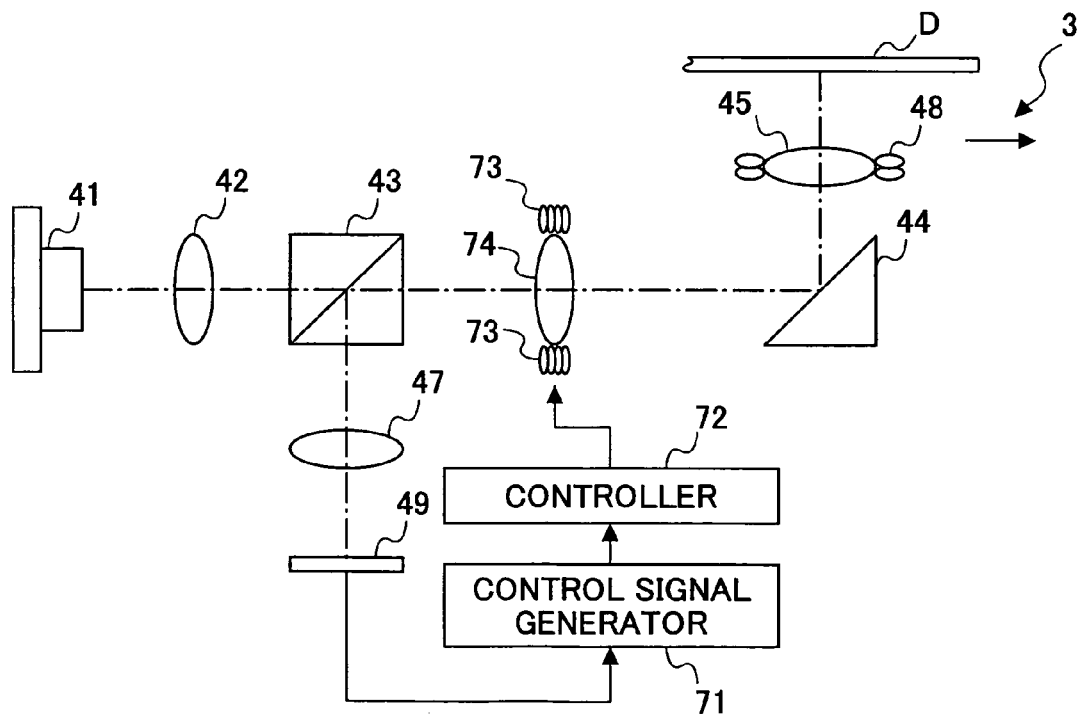

FIGS. 12A and 12B are diagrams schematically showing examples of the optical system of the optical pickup 3 according to the present embodiment.

In the optical systems of the optical pickup 3 illustrated in FIG. 12A and FIG. 12B, among signals obtained from the grooves of the optical disk D, a signal corresponding to the amplitude of the wobbling signal or the LPP signal is used as a control signal. Alternatively, a signal corresponding to the S/N ratio or the C/N ratio of these signals may also be used as the control signal, and these signals can be measured by internal circuits of the optical disk drive 1. Among signals obtained from marks of the optical disk D, for example, a signal corresponding to the amplitude of the RF signal related to a largest mark length (14T) is used as the control signal.

Figure 13A:
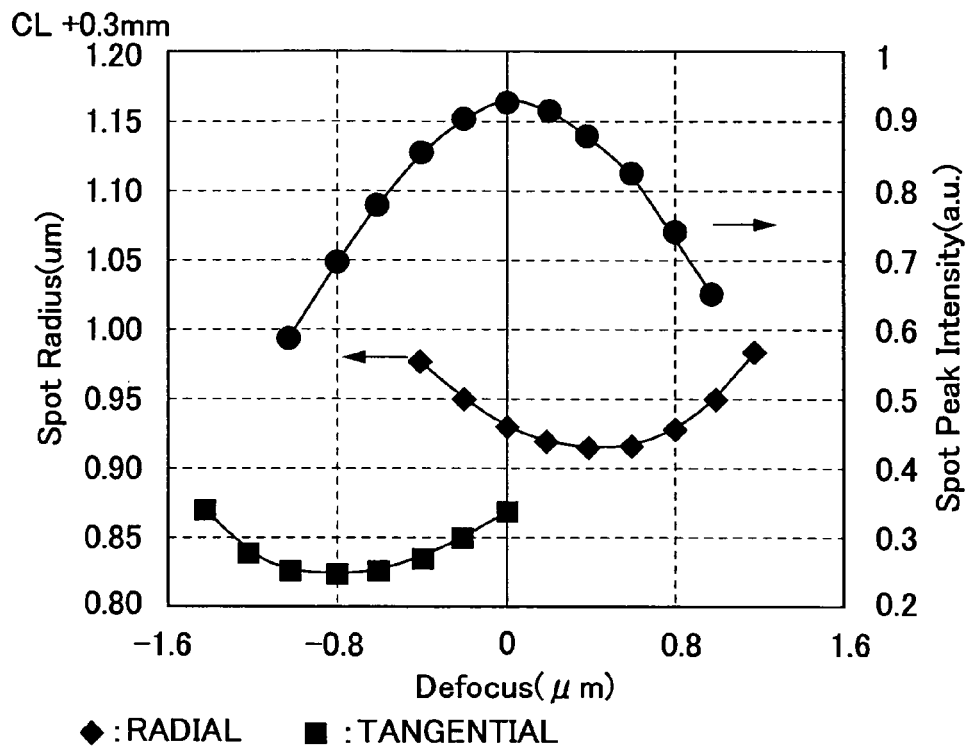
FIGS. 13A and 13B show relations of the light spot peak intensity, the radial spot size, and the tangential spot size when both the astigmatism and the spherical aberration are present.
Figure 13B:
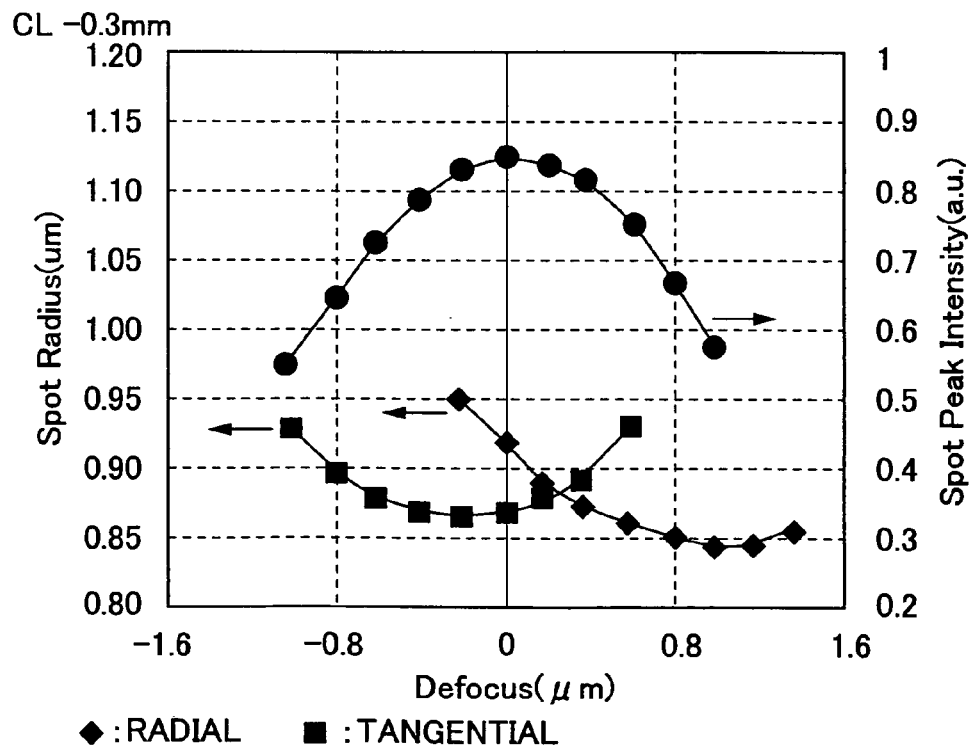

FIGS. 13A and 13B show graphs illustrating relations of the peak intensity of the light spot, the size of the light spot in the radial direction, and the size of the light spot in the tangential direction when both the astigmatism and the spherical aberration are present.

As illustrated in FIGS. 13A and 13B, when both the astigmatism and the spherical aberration are present, the focus position resulting in a minimum radial spot size is nearly the same as the focus position resulting in a minimum tangential spot size, but because of the spherical aberration, the focus position related to a peak of the intensity of the light spot is different from the focus position related to the minimum radial spot size and the focus position related to the minimum tangential spot size.

FIGS. 13A and 13B show simulation results with the position of the collimator lens 42 being shifted by +0.3 mm and −0.3 mm, respectively, relative to an ideal position. In FIGS. 13A and 13B, the round dots represent the peak intensity of the light spot, and as shown in FIG. 10, corresponding to the amplitude of the RF signal, the peak intensity of the light spot changes along with defocusing.

The diamond marks indicate the size of the light spot in the radial direction, and when the size of the light spot in the radial direction is a minimum, the amplitude of the wobbling signal becomes a maximum. The square marks indicate the size of the light spot in the tangential direction. Here, the "+" direction is defined to be the direction of the central incident light beam, and the "−" direction is defined to be opposite to the "+" direction.

For example, a measurement is made to obtain the focus position F1 related to a maximum amplitude of the RF signal (that is, related to a maximum intensity of the light spot), and the focus position F2 related to a maximum amplitude of the wobbling signal (that is, related to a minimum spot size in the radial direction), and by using a spherical aberration generation element, a spherical aberration may be generated and added to the laser beam emitted from the semiconductor laser 41 passing through the optical system so that the difference (F1−F2) is sufficiently small.

As the spherical aberration generation element, for example, the collimator lens 42 may be set to be movable along the optical axis of the laser beam, and be driven by a control signal.

In an exemplary embodiment, as illustrated in FIG. 12A, a control signal generator 71 generates a control signal from the optical signal detected by the photo detector 49, and a controller 72 controls an actuator 73 to move the collimator lens 42 along the direction of the optical axis of the laser beam, thereby adding the spherical aberration to the laser beam.

The collimator lens 42 may also include a number of lenses, and one or more of such lenses may be set to be movable along the direction of the optical axis of the laser beam to generate additional spherical aberration. In FIG. 12B, a lens 74 is used, for example, as the lens for the purpose of aberration correction.

Figure 14A:
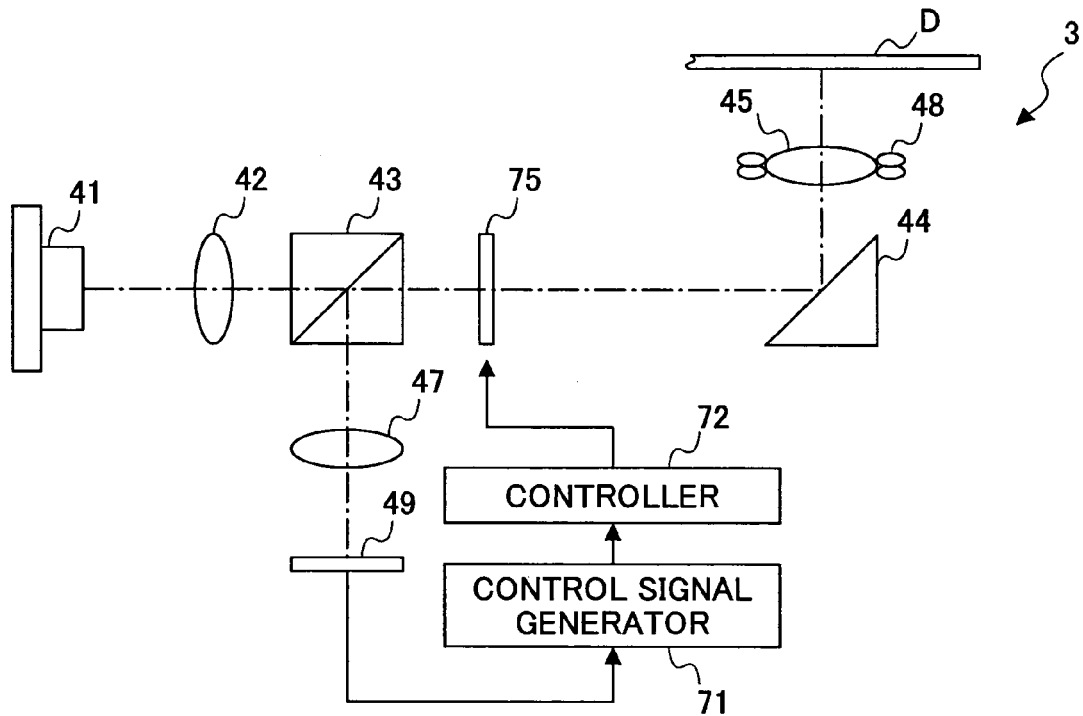
FIGS. 14A and 14B are diagrams schematically showing other examples of the optical pickup 3 according to the present embodiment.
Figure 14B:
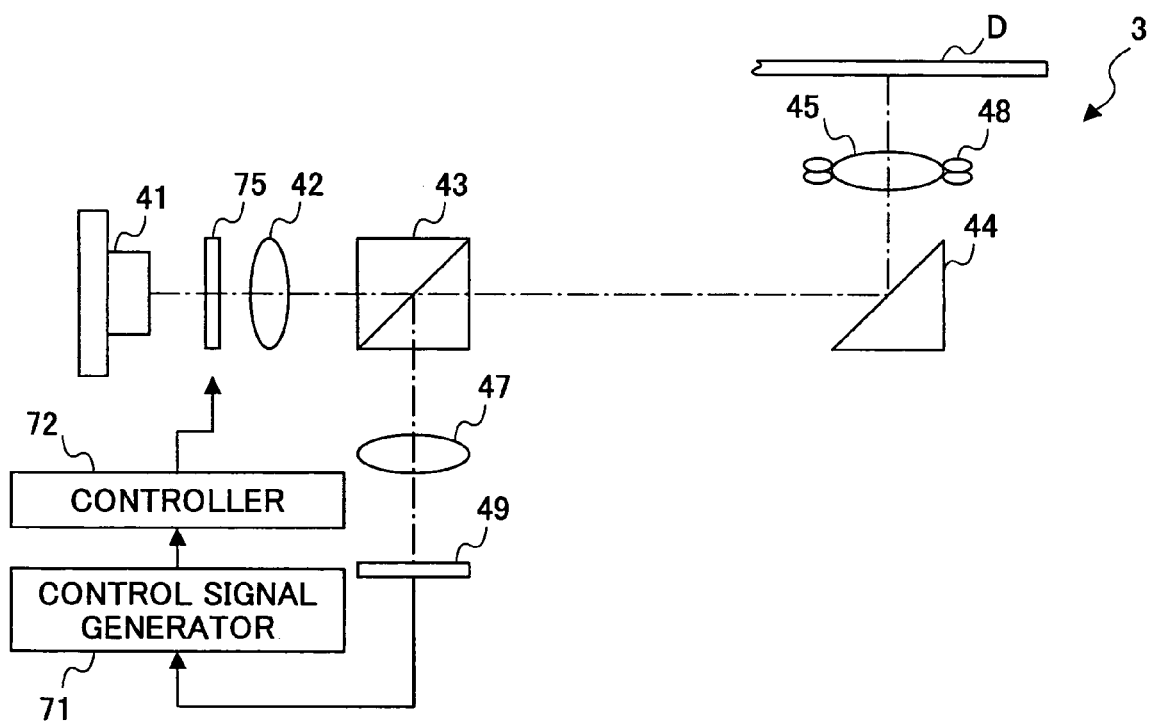

FIGS. 14A and 14B are diagrams schematically showing other examples of the optical system of the optical pickup 3 according to the present embodiment.

As illustrated in FIGS. 14A and 14B, a refractive-index variable element 75 may also be used as a spherical aberration generation element. Because the refractive index of the element 75 is variable, it is not necessary to install the actuator 73 for moving the element 75, and it is sufficient to control the refractive index of the element 75 by the controller 72. Crystals having complex refractive indices, such as lithium niobate, may be used, for example, to form a lens having a variable focus length, or a refractive-index variable element. Considering that these materials need a high voltage and their applications are limited, generally, a liquid crystal element having a parallel plate configuration can be used. For details, reference can be made to, for example, Japanese Laid-Open Patent Application No. 2000-3526 and Japanese Laid-Open Patent Application No. 2001-176108.

The element 75 for generating the spherical aberration may also be arranged in the optical system illustrated in FIG. 14A, which involves a divergent light path (it is also true for a focusing light path). In this case, the spherical aberration can be added to the light beam passing through the collimator lens 74 by just changing the refractive index of the element 75.

When a liquid crystal element is used as the element 75 to generate the spherical aberration, the electrode of the liquid crystal element may be a solid one. However, because the optical system in FIG. 14A involves a divergent light path, if the optical system involves uncertainty in alignment relative to the optical axis, for example, optical parts of the optical system are somehow inclined relative to the optical axis, the liquid crystal element may generate unexpected astigmatism.

To avoid this problem, the element 75 for generating the spherical aberration may be arranged in an optical system having a parallel light path, as illustrated in FIG. 14B, and this lowers the requirement of accuracy in setting the optical system.

In this case, however, in order to generate the spherical aberration, the element 75 for generating the spherical aberration suffers from some limitations, for example, the electrode of the element 75 should have a concentric shape and the element needs additional members. Due to this, the cost of fabricating the element may increase.

Figure 15A:
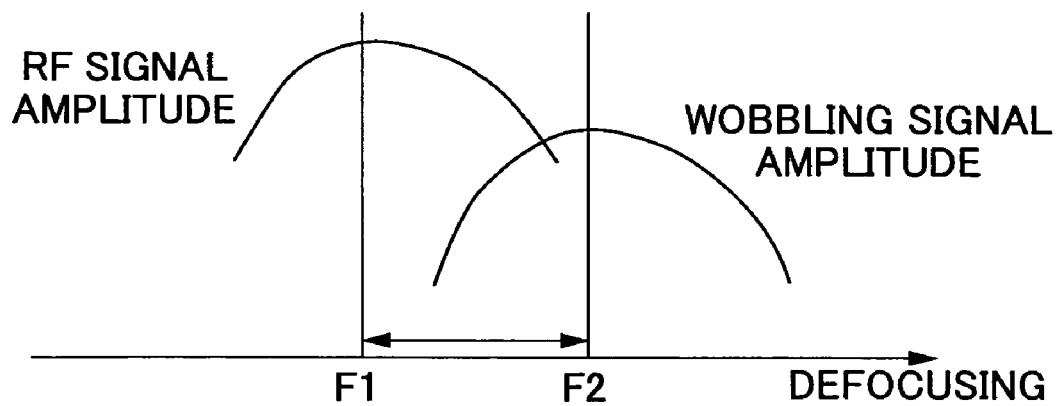
FIGS. 15A and 15B show graphs for illustrating a relation between the focus positions, and amplitudes of the RF signal and the wobbling signal when the collimator lens 74 is set at a predetermined position or when a predetermined voltage is applied on the refractive-index variable element 75.

FIG. 15A shows a relation between the focus position and the amplitudes of the RF signal and the wobbling signal when the collimator lens 74 is set at a predetermined position A, or when a predetermined voltage "a" is applied to the refractive-index variable element 75.

Figure 15B:
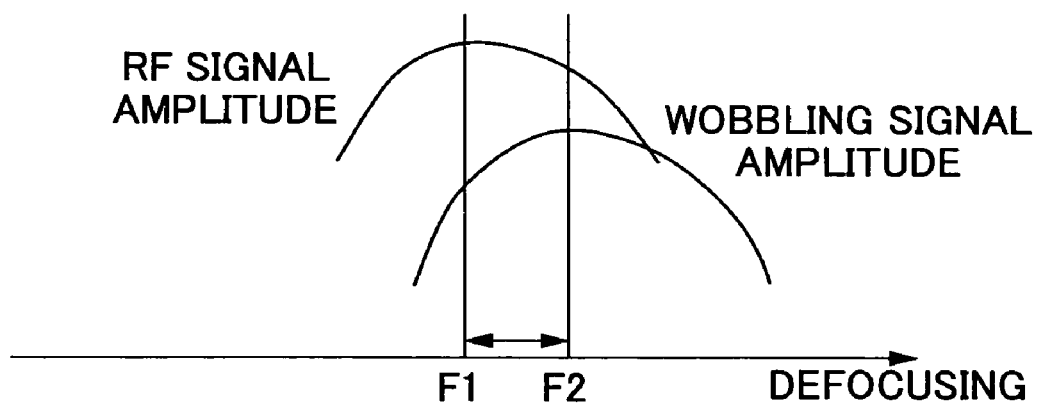

FIG. 15B shows a relation between the focus position and the amplitudes of the RF signal and the wobbling signal when the collimator lens 74 is set at a predetermined position B, or when a predetermined voltage "b" is applied to the refractive-index variable element 75.

As illustrated in FIG. 15B, the difference (F1−F2) is smaller than that in FIG. 15A, where, F1 is the focus position related to a maximum amplitude of the RF signal, and F2 is the focus position F2 related to a maximum amplitude of the wobbling signal. In other words, the difference between the focus position F1 related to maximum amplitude of the RF signal and the focus position F2 related to maximum amplitude of the wobbling signal is reduced by controlling the spherical aberration.

Figure 16:
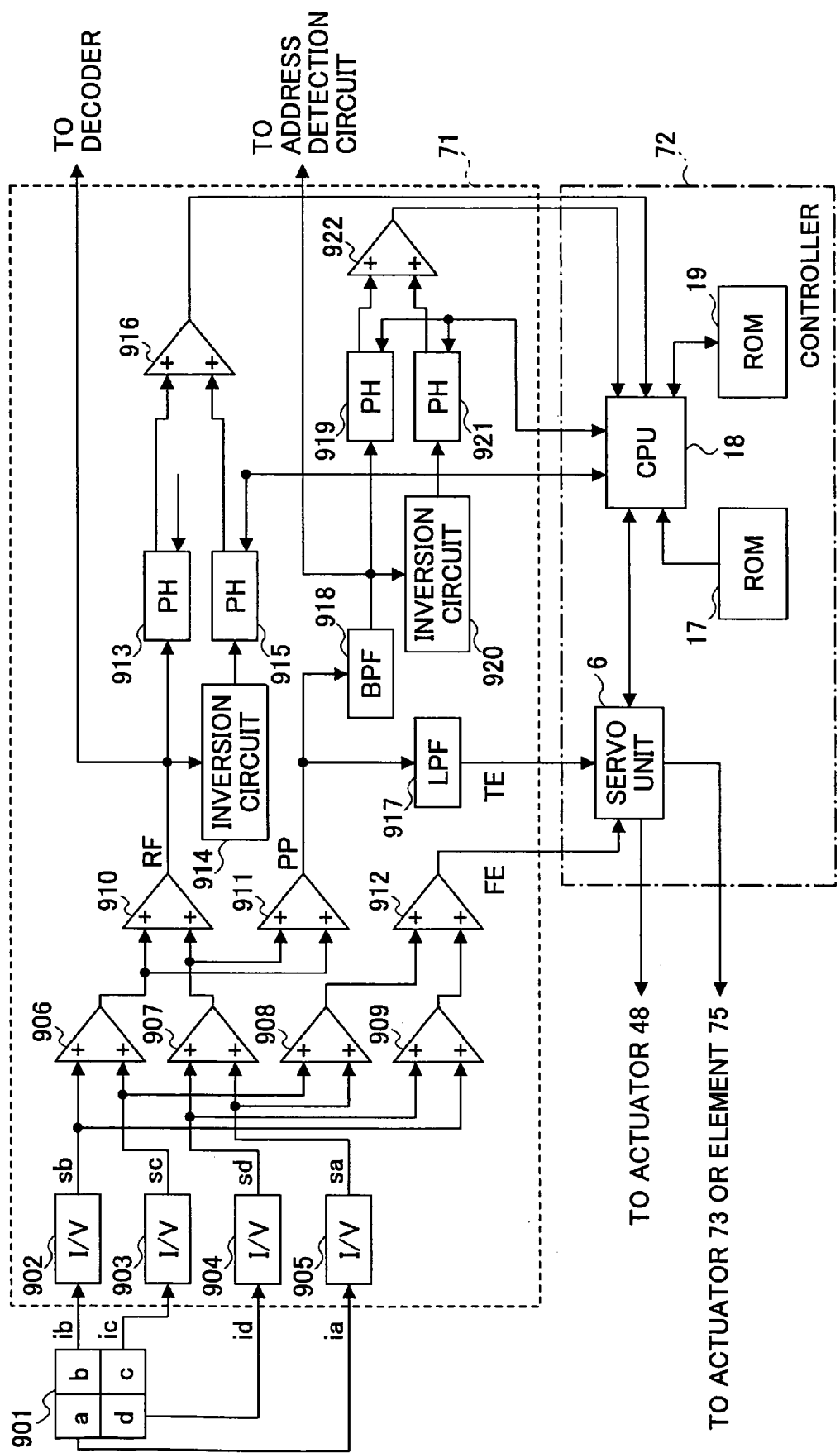
FIG. 16 is a block diagram showing circuit configurations of the control signal generator 71 and the controller 72.

Next, with reference to FIG. 16, a description is given of the circuit configurations and operations of the control signal generator 71 and the controller 72.

FIG. 16 is a block diagram showing exemplary circuit configurations of the control signal generator 71 and the controller 72.

In this example, functions of the controller 72 are realized by a control system including the CPU 18 of the optical disk drive 1 illustrated in FIG. 3.

As illustrated in FIG. 16, the photo detector 49 is divided into four divisions a, b, c, and d. Here, divisions a and d correspond to the region 104 of the photo detector 49 shown in FIG. 2, and divisions b and c correspond to the region 105 of the photo detector 49.

The divisions a, b, c, and d output currents ia, ib, ic, and id, respectively in proportion to the intensity of light received by them. The currents ia, ib, ic, and id are input to the control signal generator 71 in the read amplifier 5.

Although it is described here that the photo detector 49 is divided into four divisions, of course, the present embodiment is not limited to this. For example, the photo detector 49 may also be divided into eight divisions in the so-called three-beam method.

In the control signal generator 71, the currents ia, ib, ic, and id are input to I/V converters 902, 903, 904, and 905, respectively, and are converted into voltage signals Sa, Sb, Sc, and Sd. An accumulator 906 sums the voltage signals Sb and Sc, an accumulator 907 sums the voltage signals Sa and Sd, an accumulator 908 sums the voltage signals Sa and Sc, and an accumulator 909 sums the voltage signals Sb and Sd. In addition, an accumulator 910 sums output signals from the accumulator 906 and the accumulator 907, and outputs a reproduction signal (the RF signal). A subtraction circuit 911 subtracts the output signal of the accumulator 906 from the output signal of the accumulator 907, and outputs a push-pull (PP) signal. A subtraction circuit 912 subtracts the output signal of the accumulator 909 from the output signal of the accumulator 908, and outputs a focus error (FE) signal.

The RF signal is input to the DVD decoder 7 and to a peak-hold circuit 913. The peak-hold circuit 913 holds a local maximum of the RF signal in response to an instruction from the CPU 18 and outputs a level related to the local maximum.

The RF signal is inverted in polarity in an inversion circuit 914, and then input to a peak-hold circuit 915.

The peak-hold circuit 915 holds a local maximum of the polarity-inverted RF signal, that is, a local minimum of the original RF signal, in response to an instruction from the CPU 18 and outputs a level related to the local minimum.

An accumulator 916 sums output signals from the peak-hold circuits 913 and 915, thereby obtaining the amplitude of the RF signal, which is approximately a difference between the local maximum and the local minimum. The accumulator 916 outputs a signal indicating the amplitude of the RF signal to the CPU 18.

The PP signal is input to the low-pass filter 917 having a predetermined cut-off frequency, and the low-pass filter 917 outputs a track error (TE) signal to the servo unit 6.

The PP signal is also input to a band-pass filter 918 to generate a wobbling (WBL) signal (or a land pre-pit (LPP) signal when the optical disk D is a DVD-RW disk or a DVD-R disk). Usually, the band-pass filter 918 is formed from a low-pass filter and a high-pass filter for accurately extracting a phase-modulation part of a signal.

The wobbling signal is input to a not-illustrated address detection circuit in the ADIP decoder 8 and to a peak-hold circuit 919. The address detection circuit demodulates the wobbling signal to obtain address information. The peak-hold circuit 919 holds a local maximum of the wobbling signal in response to an instruction from the CPU 18 and outputs a level related to the local maximum. The wobbling signal is inverted in polarity in an inversion circuit 920, and then input to a peak-hold circuit 921. The peak-hold circuit 921 holds a local maximum of the polarity-inverted wobbling signal, that is, a local minimum of the original wobbling signal, in response to an instruction from the CPU 18 and outputs a level related to the local minimum.

An accumulator 922 sums output signals from the peak-hold circuits 919 and 921, thereby obtaining the amplitude of the wobbling signal, which is approximately a difference between the local maximum and the local minimum. The accumulator 922 outputs a signal indicating the amplitude of the wobbling signal to the CPU 18.

When the optical disk D is a DVD-RW disk or a DVD-R disk, a local maximum of the LPP signal is held when the local maximum of the LPP signal is greater than a predetermined value, and the value is output to the CPU 18 directly.

The CPU 18 controls the servo unit 6 according to control programs stored in the ROM 17.

The servo unit 6 controls the actuator 48 which moves the object lens 45, based on the FE signal or TE signal to carry out focus servo and track servo. In addition, under instructions from the CPU 18 corresponding to the output from the accumulators 916 and 922, the servo unit 6 controls the actuator 73 that moves the collimator lenses 42 or 74, as illustrated in FIGS. 12A and 12B, or controls the voltage to be applied on the refractive-index variable element 75, as illustrated in FIGS. 14A and 14B.

The CPU 18, ROM 17, the servo unit 6 (indirectly including the RAM 19) form the controller 72.

The control signal generator 71 and the controller 72 form the aberration adjustment device of the present invention, and when the control signal generator 71 and the controller 72 are running, the reproduction signal extraction unit, and the groove shape signal extraction unit are implemented, as well as the step of acquiring the reproduction signal, and the step of acquiring the groove shape. In addition, the operations in FIG. 17 through FIG. 21 correspond to the focusing unit, the focusing step, the aberration generation unit, the aberration generation step, the aberration adjustment unit, and the aberration adjustment step. The ROM 17 corresponds to the storage medium of the present invention.

Below, descriptions are given of specific operations of the CPU 18 according to the programs stored in ROM 17 for operating the above configurations.

Figure 17:
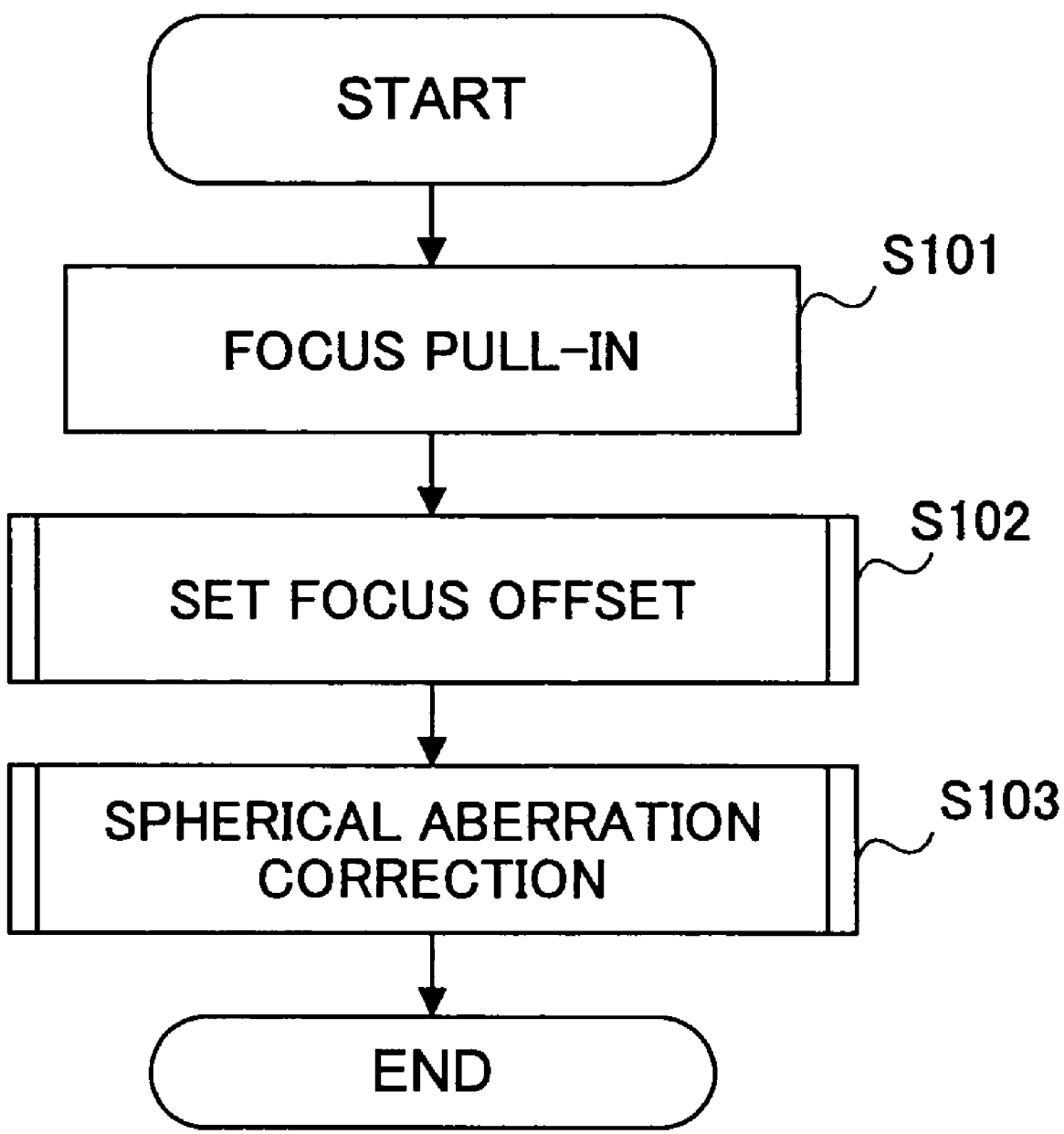
FIG. 17 is a flowchart showing the operation of state-setting according to the present embodiment.

FIG. 17 is a flowchart showing the operation of state-setting according to the present embodiment.

In step S101, the CPU 18 directs the servo unit 6 to operate the actuator 48 to carry out focus pull-in, and set focus servo ON. This step corresponds to the focusing unit of the invention.

In step S102, the CPU 18 starts to set a focus offset. The detail of the focus offset setting is described below with reference to FIG. 18 and FIG. 19.

If correction of spherical aberration is performed without setting the focus offset, step S102 can be omitted.

In step S103, the CPU 18 carries out spherical aberration correction. This step corresponds to the aberration generation unit, the aberration generation step, the aberration adjustment unit, and the aberration adjustment step.

The detail of step S103 is described below with reference to FIG. 20 and FIG. 21.

After executing the step S103, the process of state-setting is finished.

By the spherical aberration correction in S103, it is possible to improve the detection accuracy of the reproduction signal (that is, the RF signal) and the wobbling signal (WBL), enabling accurate reproduction and recording of data in the optical disk D. In addition, by executing step S102 together with step S103, because the desired value of the spherical aberration for correction is determined in step S102, spherical aberration correction in S103 can be executed quickly.

Figure 18:
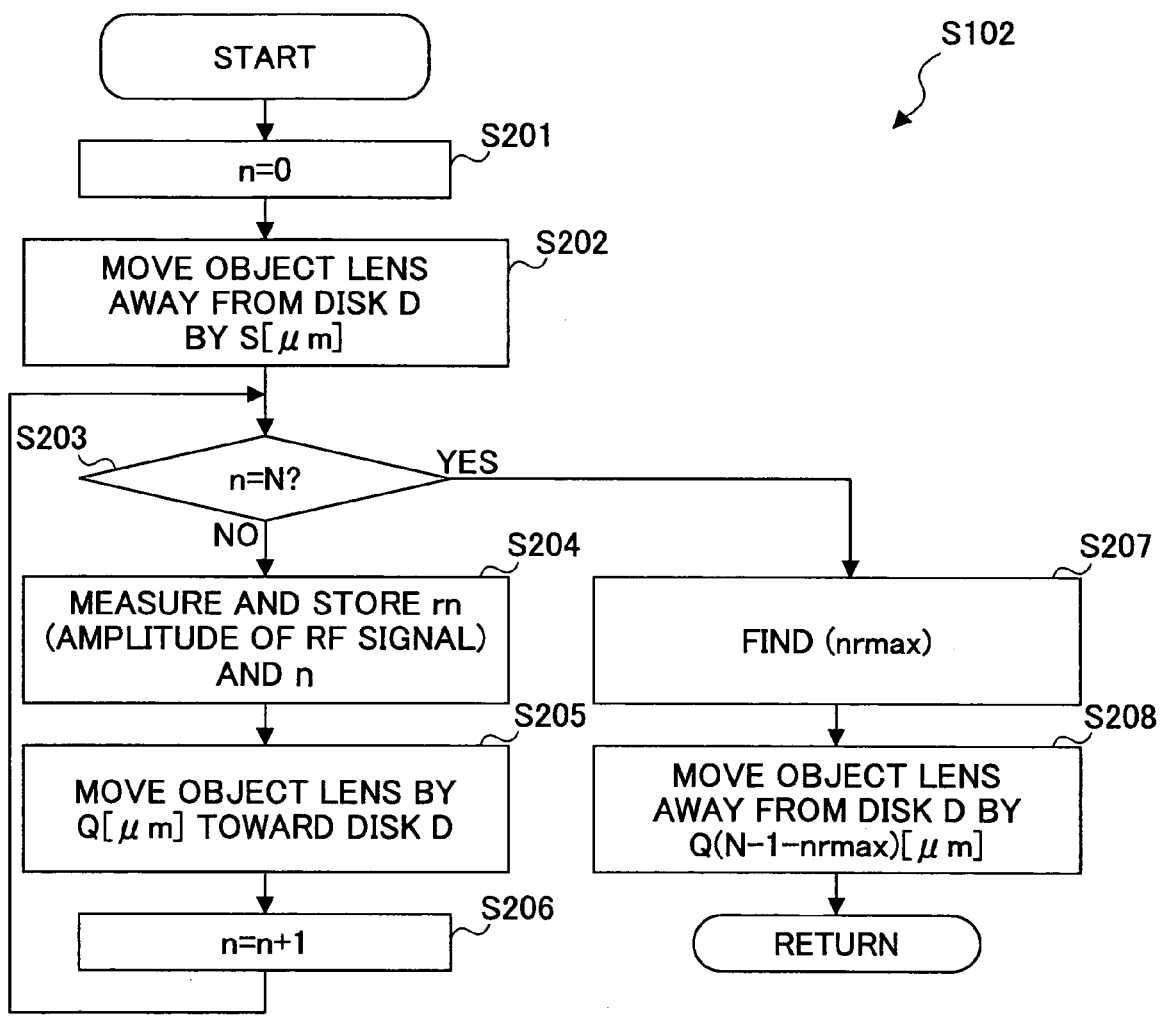
FIG. 18 is a flowchart showing the operation of the focus offset setting process (step S102 in FIG. 17) associated with the RF signal.

FIG. 18 is a flowchart showing the operation of the focus offset setting process (step S102 in FIG. 17) in the optical disk drive 1 for superposing an offset signal on a focus servo signal so that the focus position of the object lens 45 equals the position where the amplitude of the RF signal is a maximum.

In step S201, the CPU 18 resets a variable n to zero.

In step S202, the CPU 18 directs the servo unit 6 to move the object lens 45 by a distance of S [μm] (for example, S=0.5 μm) from the focus position in a focus ON state in the direction away from the optical disk D. That is, the distance S determines an initial position of the object lens 45. In response to the instruction from the CPU 18, the servo unit 6 outputs a signal (a current signal) to the actuator (focus coil) 48 so as to move the object lens 45 by the specified distance S.

In step S203, the CPU 18 determines whether the value of the variable n is equal to a predetermined value N (for example, N=11). Here, the predetermined value N represents the allowed number of times of measuring the amplitude of the RF signal.

If the CPU 18 determines n is not equal to N, the routine proceeds to step S204. If the CPU 18 determines n is equal to N, the routine proceeds to step S207.

In step S204, the CPU 18 directs the peak-hold circuits 913 and 915 to obtain the level rn of the amplitude of the RF signal at the present position of the object lens 45, and stores the level rn of the amplitude of the RF signal in the RAM 19 together with the present value of n.

In this step, it is preferable to maintain the conditions (measurement position, measurement mark length) of executing this step unchanged each time. For example, the amplitude rn of the RF signal can be detected from a mark at a predetermined address, or the amplitude rn of the RF signal can be detected in a test region recorded regularly with predetermined mark intervals. In this measurement, it is preferable to use a mark length as large as possible (for example, the largest mark length 14T), because in this case, the level of the amplitude of the RF signal is large, and thus it is possible to detect the level of the amplitude of the RF signal with high precision. Alternatively, the predetermined marks may be recorded in the test region before the present processing, and the amplitude rn of the RF signal may be detected based on the recorded marks.

In step S205, the CPU 18 directs the servo unit 6 to move the object lens 45 by a distance Q [μm] (for example, Q=0.1 μm) from the present position of the object lens 45 toward the optical disk D. In response to the instruction of the CPU 18, the servo unit 6 outputs a signal to the actuator (focus coil) 48 so as to move the object lens 45 by the specified distance Q [μm]. That is, the measurement is performed by moving the object lens 45 by the distance Q [μm] each time.

In step S206, the CPU 18 increases the value of n by one, and then the routine returns to step S203, and steps S203 through S206 are repeatedly executed until the CPU 18 determines n is equal to N in step S203.

In step S207, the CPU 18 determines the maximum of the measured levels rn of the amplitude of the RF signal stored in the RAM 19, and the value of n corresponding to the maximum amplitude of the RF signal. This value of n is denoted to be nrmax.

The maximum value may be determined by selecting the greatest value among the measured values, or may be determined by Least Square, or other approximations. It is also true in the following descriptions.

In step S208, the CPU 18 directs the servo unit 6 to move the object lens 45 by a distance equaling Q(N−1−nrmax) [μm] from the present position in the direction away from the optical disk D. In response to the instruction from the CPU 18, the servo unit 6 outputs a signal to the actuator (focus coil) 48 so as to move the object lens 45 by the specified distance Q(N−1−nrmax) [μm]. That is, the value of this signal (current signal) corresponds to the value of the focus offset. After executing the step in S208, the process of focus offset setting is finished.

In the procedure shown in FIG. 18, when measuring the amplitude of the RF signal, the object lens 45 is first moved away from the optical disk D, and then is gradually moved towards the optical disk D. But the present embodiment is not limited to this. For example, the object lens 45 may be first moved close to the optical disk D, and then gradually moved away from the optical disk D.

In the optical pickups shown in FIG. 12A and FIG. 12B, when executing the step S102 in FIG. 17, the collimator lenses 42 and 74 are set at an intermediate position of a reference position (starting position) as described below, and a position farthest from the start position reached by the collimator lenses 42 and 74 when they are moved.

In the optical pickups shown in FIG. 14A and FIG. 14B, when executing the step S102 in FIG. 17, the voltage applied on the refractive-index variable element 75 is set to be an intermediate value of a reference voltage (starting voltage) and a maximum position applied.

Figure 19:
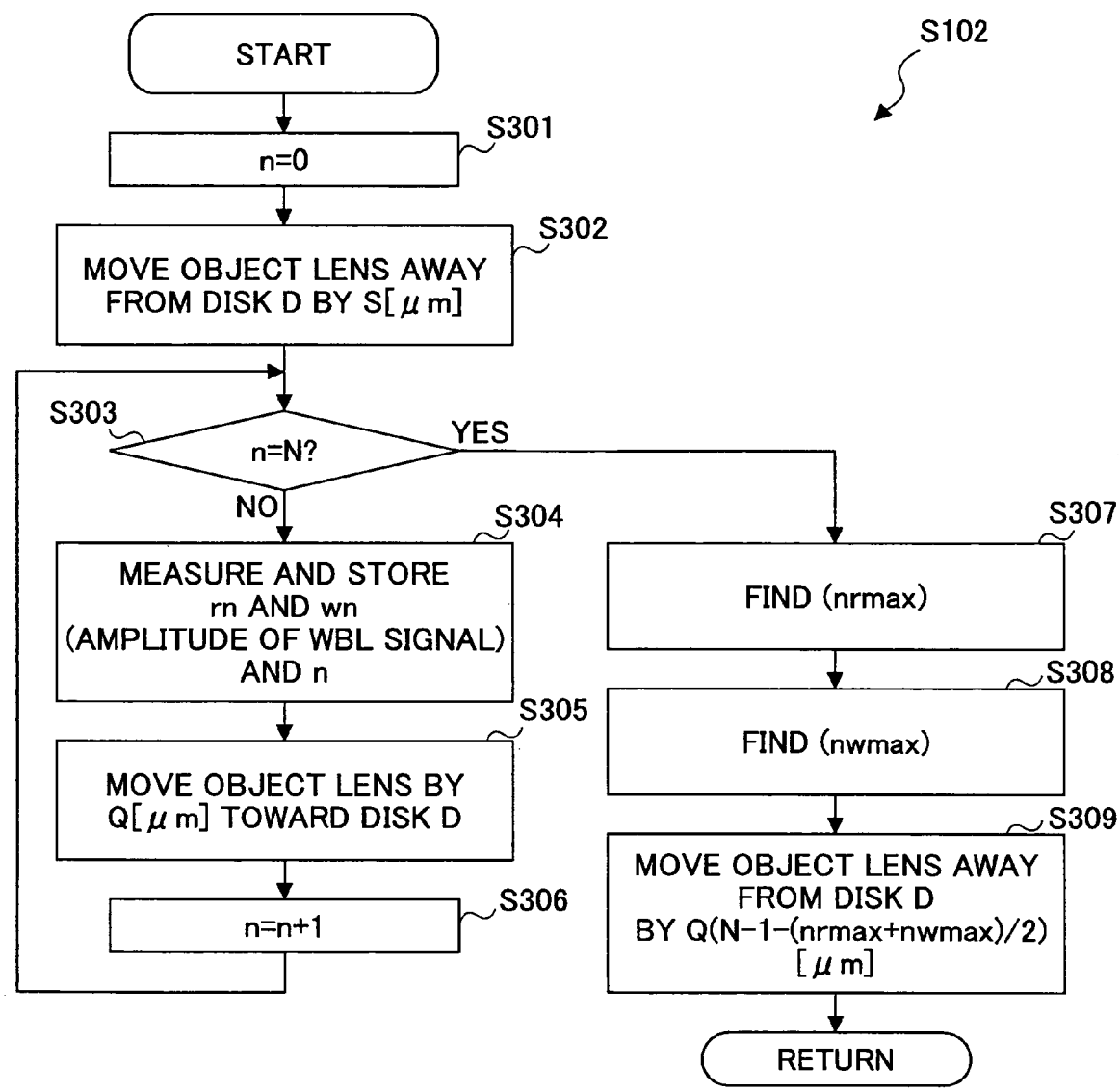
FIG. 19 is a flowchart showing the operation of the focus offset setting process (step S102 in FIG. 17) associated with the wobbling signal.

FIG. 19 is a flowchart showing the operation of the focus offset setting process (step S102 in FIG. 17) executed in the optical disk drive 1 for superposing an offset signal on a focus servo signal so that the focus position of the object lens 45 is the position where the amplitude of the wobbling signal is a maximum.

In step S301, the CPU 18 resets a variable n to zero.

In step S302, the CPU 18 directs the servo unit 6 to move the object lens 45 by a distance S [μm] (for example, S=0.5 μm) from the focus position in a focus ON state in the direction away from the optical disk D. That is, the distance S determines the initial position of the object lens 45. In response to the instruction from the CPU 18, the servo unit 6 outputs a signal (a current signal) to the actuator (focus coil) 48 so as to move the object lens 45 by the specified distance S.

In step S303, the CPU 18 determines whether the value of the variable n is equal to a predetermined value N (for example, N=11). Here, the predetermined value N represents the allowed number of times of measuring the amplitude of the RF signal.

If the CPU 18 determines n is not equal to N, the routine proceeds to step S304. If the CPU 18 determines n is equal to N, the routine proceeds to step S307.

In step S304, the CPU 18 directs the peak-hold circuits 913, 915, 919, 921 to obtain the level rn of the amplitude of the RF signal, and the level wn of the amplitude of the wobbling signal (or the level of the LPP signal when the optical disk D is a DVD-RW disk or a DVD-R disk) at the present position of the object lens 45, and stores the levels rn, wn of the amplitudes of the RF signal and the wobbling signal (or the level of the LPP signal) in the RAM 19 together with the present value of n.

In this step, it is preferable to maintain the conditions (measurement position, measurement mark length) of executing this step unchanged each time. For example, the amplitude rn of the RF signal and the amplitude wn of the wobbling signal can be detected at predetermined addresses, or the amplitude rn of the RF signal and the amplitude wn of the wobbling signal can be detected in a test region recorded regularly with predetermined mark intervals. In this measurement, it is preferable to use a mark length as large as possible (for example, the largest mark length 14T), because in this case, the level of the amplitude of the RF signal is large, and thus it is possible to detect the amplitude of the RF signal with high precision. Alternatively, predetermined marks may be recorded in the test region before the present processing, and the amplitude rn of the RF signal may be detected based on the recorded marks.

The amplitude wn of the wobbling signal may also be detected in a region having no marks, and in this case, it is possible to obtain a wobbling signal without influence of the RF signal.

In step S305, the CPU 18 directs the servo unit 6 to move the object lens 45 by a distance Q [µm] (for example, Q=0.1 µm) from the present position of the object lens 45 toward the optical disk D. In response to the instruction, the servo unit 6 outputs a signal to the actuator (focus coil) 48 so as to move the object lens 45 by the specified distance Q [µm]. That is, the measurement is performed by moving the object lens 45 by a distance Q [µm] each time.

In step S306, the CPU 18 increases the value of n by one, and then the routine returns to step S303, and steps S303 through S306 are repeatedly executed until the CPU 18 determines n is equal to N in step S303.

In step S307, the CPU 18 determines the maximum of the measured levels rn of the amplitude of the RF signal stored in the RAM 19, and the value of n corresponding to the maximum amplitude of the RF signal. This value of n is denoted to be nrmax.

In step S308, the CPU 18 determines the maximum of the measured levels wn of the amplitude of the wobbling signal stored in the RAM 19, and the value of n corresponding to the maximum amplitude of the wobbling signal. This value of n is denoted to be nwmax.

In step S309, the CPU 18 directs the servo unit 6 to move the object lens 45 by a distance equaling Q{N−1−(nrmax+nwmax)/2} [µm] from the present position in the direction away from the optical disk D. In response to the instruction from the CPU 18, the servo unit 6 outputs a signal to the actuator (focus coil) 48 so as to move the object lens 45 by the specified distance Q{N−1−(nrmax+nwmax)/2} [µm]. In other words, the object lens 45 is moved to an intermediate position of the position where the amplitude of the RF signal is a maximum and a position where the amplitude of the wobbling signal is a maximum. The value of this signal (current signal) corresponds to the value of the focus offset. After executing the step S309, the process of focus offset setting is finished.

In the operations in FIG. 19, when measuring the amplitudes of the RF signal and the wobbling signal, the object lens 45 is first moved away from the optical disk D, and then is gradually moved towards the optical disk D. But the present embodiment is not limited to this method. For example, the object lens 45 may be first moved close to the optical disk D, and then gradually moved away from the optical disk D.

Figure 20:
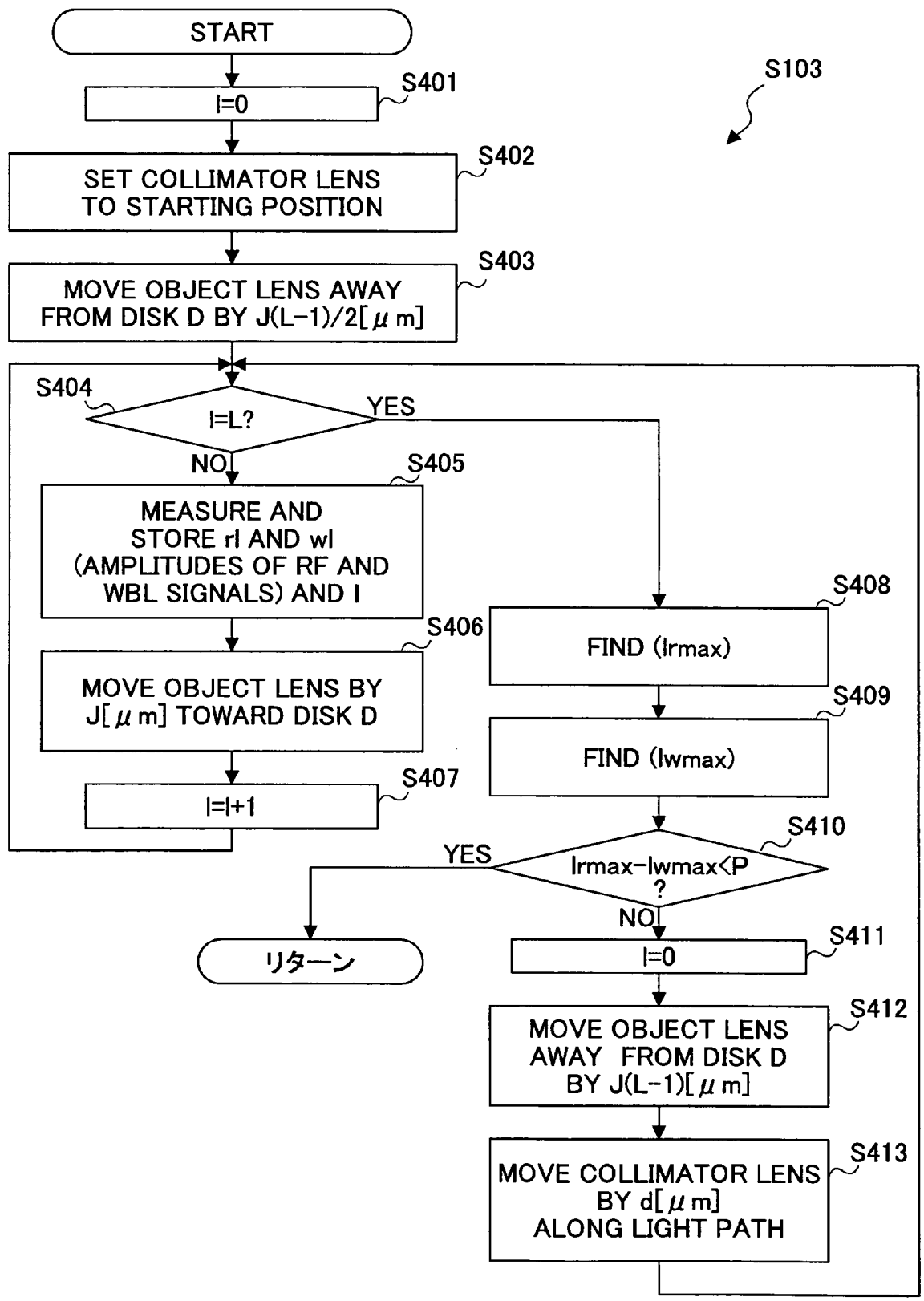
FIG. 20 is a flowchart showing an example of the operation of adjusting the spherical aberration.

FIG. 20 is a flowchart showing an exemplary operation of adjusting the spherical aberration. The operation in FIG. 20 corresponds to the configurations shown in FIG. 12A and FIG. 12B, and is executed by the CPU 18 according to the control programs stored in the ROM 17.

In step S401, the CPU 18 initializes a variable l, that is, sets l to zero.

In step S402, the CPU 18 directs the servo unit 6 to move the collimator lenses 42 and 74 to predetermined positions (starting positions).

In response to the instruction from the CPU 18, the servo unit 6 outputs a current signal to the actuator 73 so as to move the collimator lenses 42 and 74 to the starting positions, for example, the positions closest to the semiconductor laser 41 within the measurement region.

In step S403, the CPU 18 directs the servo unit 6 to move the object lens 45 by a distance equaling J(L−1)/2 [µm] in the direction away from the optical disk D. Here, J is the distance by which the object lens 45 moves each time the amplitudes of the RF signal and the wobbling signal are measured under the condition that the collimator lenses 42 and 74 are at specified positions. L is the number of times of measuring the amplitudes of the RF signal and the wobbling signal under the condition that the collimator lenses 42 and 74 are at specified positions. In response to the instruction from the CPU 18, the servo unit 6 outputs a current signal to the actuator (focus coil) 48 so as to move the object lens 45 by the specified distance J(L−1)/2 [µm].

In step S404, the CPU 18 determines whether the value of the variable l is equal to a predetermined value L (for example, L=11).

If the CPU 18 determines l is not equal to L, the routine proceeds to step S405. If the CPU 18 determines l is equal to L, the routine proceeds to step S408.

In step S405, the CPU 18 directs the peak-hold circuits 913, 915, 919 and 921 to obtain the level rl of the amplitude of the RF signal, and the level wl of the amplitude of the wobbling signal (or the level of the LPP signal when the optical disk D is a DVD-RW disk or a DVD-R disk) at the present position of the object lens 45, and stores the levels rl, wl of the amplitudes of the RF signal and the wobbling signal (or the level of the LPP signal) in the RAM 19 together with the present value of l.

In this step, it is preferable to maintain the conditions (measurement position, measurement mark length) of executing this step unchanged each time. For example, the amplitude rl of the RF signal and the amplitude wl of the wobbling signal can be detected at predetermined addresses, or the amplitude rl of the RF signal and the amplitude wl of the wobbling signal can be detected in a test region recorded regularly with predetermined mark intervals. In this measurement, it is preferable to use a mark length as large as possible (for example, the largest mark length 14T), because in this case, the level of the amplitude of the RF signal is large, and thus it is possible to detect the amplitude of the RF signal with high precision. Alternatively, predetermined marks may be recorded in the test region before the present processing, and the amplitude rl of the RF signal may be detected based on the recorded marks.

The amplitude wl of the wobbling signal may also be detected in a region having no marks, and in this case, it is possible to obtain a wobbling signal without influence of the RF signal.

In step S406, the CPU 18 directs the servo unit 6 to move the object lens 45 by a distance J [µm] (for example, J=0.1 µm) from the present position of the object lens 45 toward the optical disk D. In response to the instruction, the servo unit 6 outputs a signal to the actuator (focus coil) 48 so as to move the object lens 45 by the specified distance J [μm]. That is, the measurement is performed by moving the object lens 45 by a distance J [μm] each time.

In step S407, the CPU 18 increases the value of l by one, and then the routine returns to step S404, and steps S404 through S407 are repeatedly executed until the CPU 18 determines l is equal to L in step S404.

In step S408, the CPU 18 determines the maximum of the measured levels rl of the amplitude of the RF signal stored in the RAM 19, and the value of l corresponding to the maximum amplitude of the RF signal. This value of l is denoted to be lrmax.

In step S409, the CPU 18 determines the maximum of the measured levels wl of the amplitude of the wobbling signal stored in the RAM 19, and the value of l corresponding to the maximum amplitude of the wobbling signal. This value of l is denoted to be lwmax.

In step S410, the CPU 18 determines whether the quantity (lrmax−lwmax) is less than a predetermined value P. Here, P is a value indicating that the spherical aberration is so small that it does not influence reproduction and recording performance. That is, the value of P is set to indicate the state that the focus position F1 related to the maximum amplitude of the RF signal and the focus position F2 related to the maximum amplitude of the wobbling signal are sufficiently close.

If the CPU 18 determines the quantity (lrmax−lwmax) is greater than P, the amplitudes of the RF signal and the wobbling signal are to be measured again with modified positions of the collimator lenses 42 and 74, and before the new measurement, steps S411 through S413 are executed.

If the CPU 18 determines the quantity (lrmax−lwmax) is less than P, the routine returns to the main control, and the operation of adjusting the spherical aberration is completed.

In step S411, the CPU 18 initializes the variable l, that is, sets l to zero, again.

In step S412, at present, because the object lens 45 is near the optical disk D, the CPU 18 directs the servo unit 6 to move the object lens 45 by a distance equaling J(L−1) [μm] in the direction away from the optical disk D. In response to the instruction from the CPU 18, the servo unit 6 outputs a current signal to the actuator (focus coil) 48 so as to move the object lens 45 by the specified distance of J(L−1) [μm].

In step S413, the CPU 18 directs the servo unit 6 to move the collimator lenses 42 and 74 along the light path by a certain distance, specifically, the CPU 18 directs the servo unit 6 to move the collimator lenses 42 and 74 along the light path by a distance d [μm] in the direction away from the optical disk D. In response to the instruction from the CPU 18, the servo unit 6 outputs a current signal to the actuator 73 so as to move the collimator lenses 42 and 74 by the specified distance d [μm].

Then, the routine returns to step S404, and steps S404 through S413 are repeatedly executed until the CPU 18 determines the quantity (lrmax−lwmax) is less than P in step S410. Then, the routine returns to the main control, and the operation of adjusting the spherical aberration is completed.

After the above operations, if it is preferred to emphasize the measurement of the RF signal rather than that of the wobbling signal, the CPU 18 directs the servo unit 6 to move the object lens 45 to the position where lrmax was obtained, that is, to move the object lens 45 to the focus position of the object lens 45 related to the maximum amplitude of the RF signal after the positions of the collimator lenses 42 and 74 are adjusted. In response to the instruction from the CPU 18, the servo unit 6 outputs a current signal to the actuator 48 so as to move the object lens 45 to the position where lrmax was obtained to assign a new offset current. The focus servo control is then performed.

If it is preferred to emphasize the measurement of the wobbling signal rather than that of the RF signal, the CPU 18 directs the servo unit 6 to move the object lens 45 to the position where lwmax was obtained, that is, to move the object lens 45 to the focus position of the object lens 45 related to the maximum amplitude of the wobbling signal after the positions of the collimator lenses 42 and 74 are adjusted. In response to the instruction from the CPU 18, the servo unit 6 outputs a current signal to the actuator 48 so as to move the object lens 45 to the position where lwmax was obtained to assign a new offset current. The focus servo control is then performed.

If it is preferred to emphasize the measurements of both the RF signal and the wobbling signal, the CPU 18 directs the servo unit 6 to move the object lens 45 to an intermediate position of the position where lwmax was obtained (that is, the focus position F1 of the object lens 45 related to the maximum amplitude of the wobbling signal after the positions of the collimator lenses 42 and 74 are adjusted) and the position where lrmax was obtained (that is, the focus position F2 of the object lens 45 related to the maximum amplitude of the RF signal after the positions of the collimator lenses 42 and 74 are adjusted), for example, the middle position of the focus positions F1 and F2. In response to the instruction from the CPU 18, the servo unit 6 outputs a current signal to the actuator 48 so as to move the object lens 45 to the intermediate position of the focus positions F1 and F2 to assign a new offset current. The focus servo is then performed.

If the quantity (lrmax−lwmax) is not less than P even after steps S404 through S413 are repeatedly executed for a predetermined period, the processing shown in FIG. 20 may be terminated, and the collimator lenses 42 and 74 may be moved to their initial positions, or to positions related to the smallest value of the quantity (lrmax−lwmax). In this way, an endless loop is avoidable which occurs when the quantity (lrmax−lwmax) is always greater than P.

Figure 21:
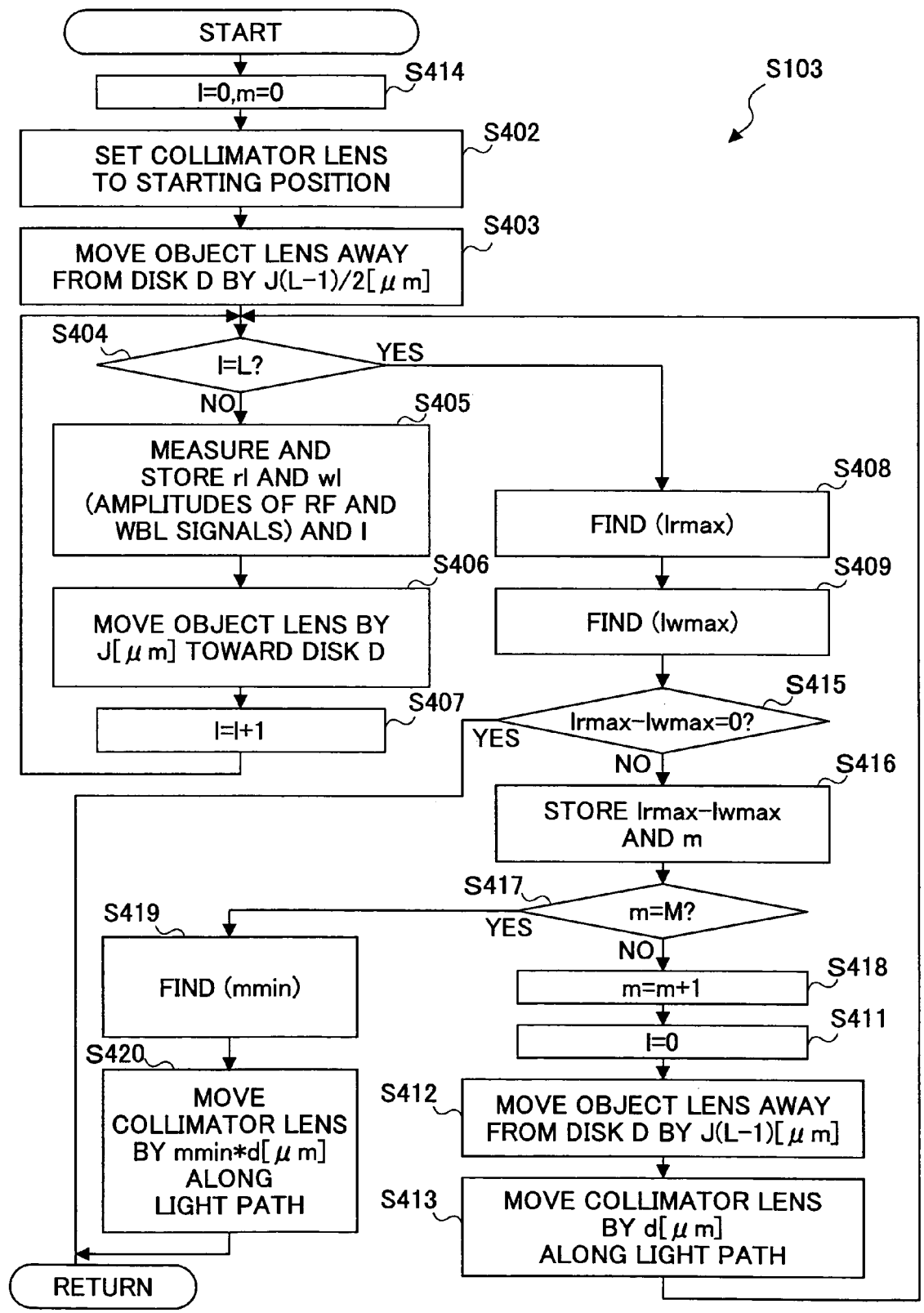
FIG. 21 is a flowchart showing another example of the operation of adjusting the spherical aberration.

FIG. 21 is a flowchart showing another exemplary operation of adjusting the spherical aberration. The operation in FIG. 21 corresponds to the configurations shown in FIG. 12A and FIG. 12B, and is executed by the CPU 18 according to the control programs stored in the ROM 17.

In FIG. 21, the same reference numbers are used for the same processes as those shown in FIG. 20, and the overlapping descriptions are omitted.

In step S414, the CPU 18 initializes variables l and m, that is, sets l and m to zero. The variable m indicates a number of times of moving the collimator lenses 42 and 74.

In step S415, the CPU 18 determines whether lrmax equals lwmax, that is, whether the focus position F1 related to the maximum amplitude of the RF signal equals the focus position F2 related to the maximum amplitude of the wobbling signal.

If the CPU 18 determines lrmax equals lwmax, it means that the spherical aberration has been well corrected for the collimator lenses 42 and 74, hence, the routine returns to the main control to end the operations of spherical aberration adjustment.

If the CPU 18 determines lrmax does not equal lwmax, the routine proceeds to step S416.

In step S416, the CPU 18 stores the difference lrmax−lwmax in the RAM 19 together with the present value of m.

In step S417, the CPU 18 determines whether the value of the variable m is equal to a predetermined value M. Here, the value M indicates the limit number of times of moving the collimator lenses 42 and 74, that is, the CPU 18 moves the collimator lenses 42 and 74 at most by a number of M times and each time by d [μm].

If the CPU 18 determines m is not equal to M, the routine proceeds to step S418. If the CPU 18 determines m is equal to M, the routine proceeds to step S419.

In step S418, the CPU 18 increases the value of m by one, and then the routine returns to step S404, and steps S404 through S409, steps S415 through S418, and steps S411 through S413 are repeatedly executed until the CPU 18 determines lrmax is equal to lwmax in step S415, or the collimator lenses 42 and 74 have been moved by a number of M times.

In step S419, if the CPU 18 determines m is equal to M, the CPU 18 determines the value of m corresponding to the minimum value of lrmax−lwmax stored in the RAM 19. This value of m is denoted to be mmin.

In step S420, the CPU 18 directs the servo unit 6 to move the collimator lenses 42 and 74 from the starting positions in a specified direction along the light path by a certain distance. Specifically, the CPU 18 directs the servo unit 6 to move the collimator lenses 42 and 74 along the light path by a distance mmin*d [μm] in the direction away from the optical disk D. The routine is then terminated.

In this way, the collimator lenses 42 and 74 are set at such positions that the focus position F1 of the object lens 45 related to the maximum amplitude of the wobbling signal is closest to the focus position F2 of the object lens 45 related to the maximum amplitude of the RF signal, thereby, correcting the spherical aberration.

Subsequently, if the routine is finished via steps S419 and S420, if it is preferred to emphasize the measurement of the RF signal rather than that of the wobbling signal, the CPU 18 directs the servo unit 6 to move the object lens 45 to the position where lrmax was obtained, that is, to move the object lens 45 to the focus position of the object lens 45 related to the maximum amplitude of the RF signal after the positions of the collimator lenses 42 and 74 are adjusted. In response to the instruction from the CPU 18, the servo unit 6 outputs a current signal to the actuator 48 so as to move the object lens 45 to the position where lrmax was obtained to assign a new offset current. The focus servo is then performed.

If it is preferred to emphasize the measurement of the wobbling signal rather than that of the RF signal, the CPU 18 directs the servo unit 6 to move the object lens 45 to the position where lwmax was obtained, that is, to move the object lens 45 to the focus position of the object lens 45 related to the maximum amplitude of the wobbling signal after the positions of the collimator lenses 42 and 74 are adjusted. In response to the instruction from the CPU 18, the servo unit 6 outputs a current signal to the actuator 48 so as to move the object lens 45 to the position where lwmax was obtained to assign a new offset current. The focus servo is then performed.

If it is preferred to emphasize the measurements of both the RF signal and the wobbling signal, the CPU 18 directs the servo unit 6 to move the object lens 45 to an intermediate position of the position where lwmax was obtained (that is, the focus position F1 of the object lens 45 related to the maximum amplitude of the wobbling signal after the positions of the collimator lenses 42 and 74 are adjusted) and the position where lrmax was obtained (that is, the focus position F2 of the object lens 45 related to the maximum amplitude of the RF signal after the positions of the collimator lenses 42 and 74 are adjusted), for example, the middle position of the focus positions F1 and F2. In response to the instruction from the CPU 18, the servo unit 6 outputs a current signal to the actuator 48 so as to move the object lens 45 to the intermediate position of the focus positions F1 and F2 to assign a new offset current. The focus servo control is then performed.

If the routine is finished when the answer in step S415 is affirmative, that is, lrmax is equal to lwmax, the CPU 18 directs the servo unit 6 to move the object lens 45 to the position where lwmax and lrmax were obtained (that is, the focus positions F1 and F2 of the object lens 45 related to the maximum amplitudes of the RF signal and the wobbling signal after the positions of the collimator lenses 42 and 74 are adjusted). In response to the instruction from the CPU 18, the servo unit 6 outputs a current signal to the actuator 48 so as to move the object lens 45 to the intermediate position of the focus positions F1 and F2 to assign a new offset current. The focus servo control is then performed.

Figure 22:
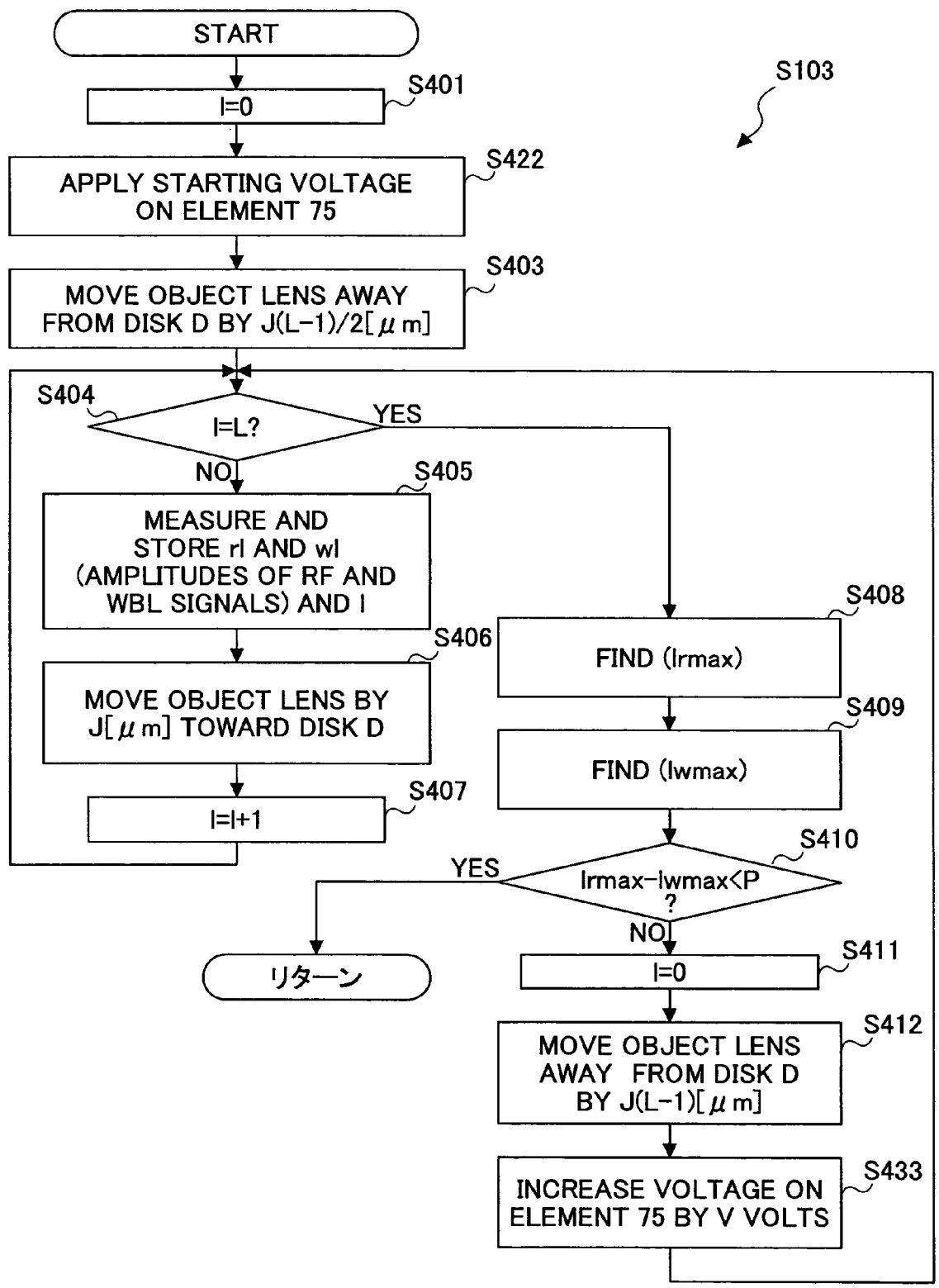
FIG. 22 is a flowchart showing another example of the operation of adjusting the spherical aberration.

FIG. 22 is a flowchart showing another exemplary operation of adjusting the spherical aberration. The operation in FIG. 22 corresponds to the configurations shown in FIG. 14A and FIG. 14B, and is executed by the CPU 18 according to the control programs stored in the ROM 17.

In FIG. 22, the same reference numbers are used for the same processes as those shown in FIG. 20 and FIG. 21, and overlapping descriptions are omitted.

In step S422, the CPU 18 directs the servo unit 6 to apply a reference voltage (starting voltage) on the refractive-index variable element 75. In response to the instruction from the CPU 18, the servo unit 6 applies the starting voltage on the refractive-index variable element 75.

In step S433, the CPU 18 directs the servo unit 6 to increase the voltage applied on the refractive-index variable element 75 by v volts. In response to the instruction from the CPU 18, the servo unit 6 applies a voltage increased by v volts on the refractive-index variable element 75.

In this way, by using the refractive-index variable element 75, spherical aberration correction is achieved.

Subsequently, if it is preferred to emphasize the measurement of the RF signal rather than that of the wobbling signal, the CPU 18 directs the servo unit 6 to move the object lens 45 to the position where lrmax was obtained, that is, to move the object lens 45 to the focus position of the object lens 45 related to the maximum amplitude of the RF signal after the voltage applied on the refractive-index variable element 75 is adjusted. In response to the instruction from the CPU 18, the servo unit 6 outputs a current signal to the actuator 48 so as to move the object lens 45 to the position where lrmax was obtained to assign a new offset current. Then, the focus servo control is performed.

If it is preferred to emphasize the measurement of the wobbling signal rather than that of the RF signal, the CPU 18 directs the servo unit 6 to move the object lens 45 to the position where lwmax was obtained, that is, to move the object lens 45 to the focus position of the object lens 45 related to the maximum amplitude of the wobbling signal after the voltage applied on the refractive-index variable element 75 is adjusted. In response to the instruction from the CPU 18, the servo unit 6 outputs a current signal to the actuator 48 so as to move the object lens 45 to the position where lwmax was obtained to assign a new offset current. Then, the focus servo control is performed.

If it is preferred to emphasize the measurements of both the RF signal and the wobbling signal, the CPU 18 directs the servo unit 6 to move the object lens 45 to an intermediate position of the position where lwmax was obtained (that is, the focus position F1 of the object lens 45 related to the maximum amplitude of the wobbling signal after the voltage applied on the refractive-index variable element 75 is adjusted) and the position where lrmax was obtained (that is, the focus position F2 of the object lens 45 related to the maximum amplitude of the RF signal after the voltage applied on the refractive-index variable element 75 is adjusted), for example, the middle position of the focus positions F1 and F2. In response to the instruction from the CPU 18, the servo unit 6 outputs a current signal to the actuator 48 so as to move the object lens 45 to the intermediate position of the focus positions F1 and F2 to assign a new offset current. Then, the focus servo is performed.

If the quantity (lrmax−lwmax) is not less than P even after steps S404 through S433 are repeatedly executed for a predetermined period, the processing shown in FIG. 22 may be terminated, and the starting voltage, or the voltage related to the minimum of the quantity of (lrmax−lwmax), may be applied on the refractive-index variable element 75. In this way, an endless loop is avoidable which occurs when the quantity (lrmax−lwmax) is always greater than P.

Figure 23:
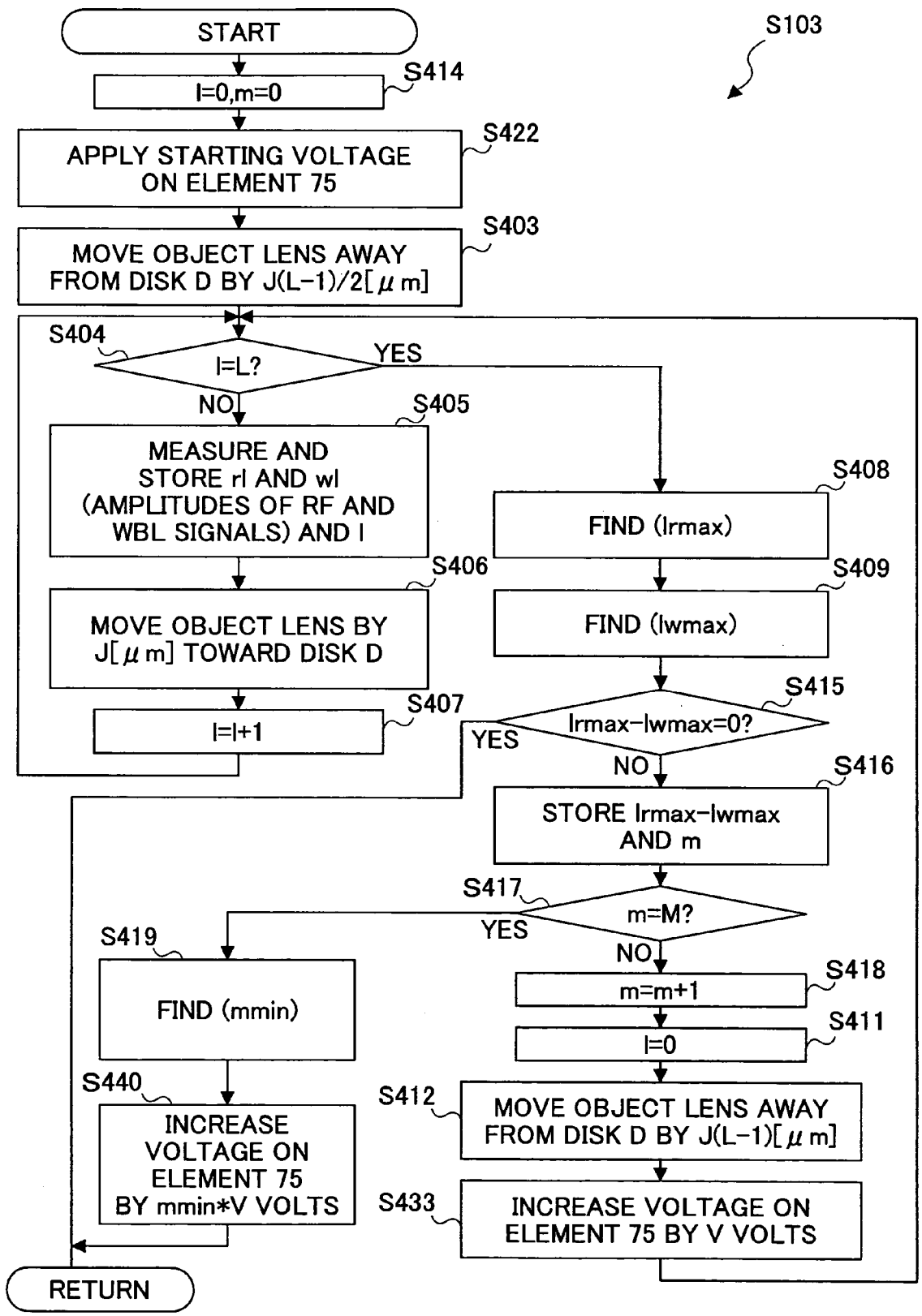
FIG. 23 is a flowchart showing another example of the operation of adjusting the spherical aberration.

FIG. 23 is a flowchart showing another exemplary operation of adjusting the spherical aberration. The operation in FIG. 23 corresponds to the configurations shown in FIG. 14A and FIG. 14B, and is executed by the CPU 18 according to the control programs stored in the ROM 17. It should be noted that the operation in FIG. 23 is for optical disks like DVD+RW, DVD+R, CD-R, or CD-RW, which do not have land pre-pits (LPP) 111.

In FIG. 23, the same reference numbers are used for the same processes as those shown in FIG. 20, FIG. 21 and FIG. 22, and overlapping descriptions are omitted.

In step S440, the CPU 18 directs the servo unit 6 to increase the voltage applied on the refractive-index variable element 75 by (mmin*v) volts from the starting voltage. In response to the instruction from the CPU 18, the servo unit 6 applies a voltage increased by (mmin*v) volts on the refractive-index variable element 75.

In this way, correction of the spherical aberration is achieved by using the refractive-index variable element 75.

Subsequently, if the routine is finished via steps S419 and S420, and if it is preferred to emphasize the measurement of the RF signal rather than that of the wobbling signal, the CPU 18 directs the servo unit 6 to move the object lens 45 to the position where lrmax was obtained, that is, to move the object lens 45 to the focus position of the object lens 45 related to the maximum amplitude of the RF signal after the voltage applied on the refractive-index variable element 75 is adjusted. In response to the instruction from the CPU 18, the servo unit 6 outputs a current signal to the actuator 48 so as to move the object lens 45 to the position where lrmax was obtained to assign a new offset current. Then, the focus servo is performed.

If it is preferred to emphasize the measurement of the wobbling signal rather than that of the RF signal, the CPU 18 directs the servo unit 6 to move the object lens 45 to the position where lwmax was obtained, that is, to move the object lens 45 to the focus position of the object lens 45 related to the maximum amplitude of the wobbling signal after the voltage applied on the refractive-index variable element 75 is adjusted. In response to the instruction from the CPU 18, the servo unit 6 outputs a current signal to the actuator 48 so as to move the object lens 45 to the position where lwmax was obtained to assign a new offset current. Then, the focus servo is performed.

If it is preferred to emphasize the measurements of both the RF signal and the wobbling signal, the CPU 18 directs the servo unit 6 to move the object lens 45 to an intermediate position of the position where lwmax was obtained (that is, the focus position F1 of the object lens 45 related to the maximum amplitude of the wobbling signal after the voltage applied on the refractive-index variable element 75 is adjusted) and the position where lrmax was obtained (that is, the focus position F2 of the object lens 45 related to the maximum amplitude of the RF signal after the voltage applied on the refractive-index variable element 75 is adjusted), for example, the middle position of the focus positions F1 and F2. In response to the instruction from the CPU 18, the servo unit 6 outputs a current signal to the actuator 48 so as to move the object lens 45 to the intermediate position of the focus positions F1 and F2 to assign a new offset current. Then, the focus servo control is performed.

If the routine is finished when the answer in step S415 is affirmative, that is, lrmax is equal to lwmax, the CPU 18 directs the servo unit 6 to move the object lens 45 to the position where lwmax and lrmax were obtained (that is, the focus positions F1 and F2 of the object lens 45 related to the maximum amplitudes of the RF signal and the wobbling signal after the voltage applied on the refractive-index variable element 75 is adjusted). In response to the instruction from the CPU 18, the servo unit 6 outputs a current signal to the actuator 48 so as to move the object lens 45 to the intermediate position of the focus positions F1 and F2 to assign a new offset current. Then, the focus servo control is performed.

In the operations shown in FIG. 17 through FIG. 23, the maximum amplitudes of the RF signal and the wobbling signal may be obtained by approximation calculations or interpolation calculations, and the object lens 45 or the collimator lenses 42 and 74 are moved, or the voltage applied on the refractive-index variable element 75 is adjusted, so that the amplitudes of the RF signal and the wobbling signal become the calculated value of the maximums.

By performing the control procedure described above before the operation of recording data in the optical disk D in the optical disk drive 1, it is possible to reduce influences of astigmatism caused by misalignment of the optical system generated from temperature rising in the optical disk drive 1 before data recording.

In addition, by performing the control procedure described above after the operation of recording data in the optical disk D, it is possible to reduce influences of astigmatism caused by misalignment of the optical system generated from temperature rising in the optical disk drive 1 due to the recording operation.

In addition, by performing the control procedure described above in successive recording operations at specified time intervals, for example, once every five minutes, or once each time 1000 tracks are recorded, it is possible to reduce influences of astigmatism caused by misalignment of the optical system generated from a temperature rising in the optical disk drive 1 due to the recording operation.

In addition, by performing the control procedure described above at specified positions, for example, 30 mm, or 40 mm, or 50 mm from the center of the optical disk D, it is possible to reduce influences of astigmatism caused by intrinsic bending of the optical disk D.

In the present embodiment, a spherical aberration element may also be used, which is capable of correcting the spherical aberration due to the difference of substrate thickness in an optical disk having multiple recording layers, for example, a two-layer DVD disk.

Second Embodiment

In the present embodiment, descriptions are mainly made of corrections to aberrations, and particularly astigmatism.

As described in the first embodiment, FIG. 7 shows the wave-form of the push-pull signal used for groove tracking, which is obtained by cutting the high-frequency component in the signal in FIG. 6B by using a low-pass filter. In this case, ideally, in the optical pickup 3, the amplitude of the RF signal becomes a maximum, and the error rate of the information signal becomes a minimum when the focus signal is zero, resulting in optimum quality of signals obtained from the wobbling signal or the LPP signal.

Therefore, as illustrated in FIG. 8, a focus control may be performed to detect the amplitude of the RF signal by using an internal circuit while changing a focus position within a range from −0.5 µm to +0.5 µm relative to the original focus position, perform approximating calculations to find the focus position where the amplitude of the RF signal becomes a maximum by using an internal CPU, and add an offset to the focus signal so that the focus position is controlled to correspond to the maximum amplitude of the RF signal constantly.

However, as illustrated in FIGS. 9A and 9B, if the astigmatism is present in the light spot due to uncertainty occurring when assembling optical parts in the optical pickup 3, or due to intrinsic characteristics of the laser diode 41, the focus position where the light spot has a minimum size in the radial direction is different from the focus position where the light spot has a minimum size in the tangential direction. In this case, as illustrated in FIG. 9B, the focus position related to the minimum light spot in the radial direction, and the focus position related to the minimum light spot in the tangential direction are shifted relative to the peak position of the intensity of the light spot.

On the other hand, the position related to the maximum amplitude of the RF signal is not dependent on the astigmatism, and basically coincides with the peak position of the intensity of the light spot, as illustrated in FIG. 10.

Generally, the error rate of the information signal is a minimum when the amplitude of the RF signal is a maximum, and the quality of the signals obtained from the wobbling signal or the LPP signal is optimum when the light spot size is a minimum in the radial direction. For this reason, the quality of signals obtained from the wobbling signal or the LPP signal is probably not sufficiently high even at the focus position where the amplitude of the RF signal is a maximum.

Therefore, when carrying out focus control to appropriately adjust the focus position, if the astigmatism is present, for example, it is not sufficient to adjust the focus position so that the amplitude of the RF signal is a maximum at the focus position. Instead, it is more desirable to find a focus position F1 where the amplitude of the RF signal is a maximum, and a focus position F2 where the amplitude of the wobbling signal is a maximum, and carry out focus control to adjust the focus position to be a mean value F of F1 and F2 (F=(F1+F2)/2).

In this case, however, if the astigmatism is quite large, there is a risk that quality of both of the RF signal and the wobbling signal can not be guaranteed at the intermediate position F.

The present embodiment is for solving this problem by chiefly suppressing the astigmatism among the aberrations so as to obtain signals of high qualities. In the following description, the same reference numbers are used for the same elements as those in the preceding embodiment, and the overlapping descriptions are omitted.

The optical disk drive according to the present embodiment has the same configuration as the optical disk drive 1 of the first embodiment as shown in FIG. 3 and FIG. 4, operations of the control signal generator 71 and the controller 72 are the same that described with reference to FIG. 16, and the optical pickups as illustrated in FIGS. 12A and 12B, and in FIGS. 14A and 14B are also used for adjustment of the astigmatism.

In the optical pickup 3 illustrated in FIGS. 12A and 12B, and in FIGS. 14A and 14B, among signals obtained from the grooves of the optical disk D, a signal corresponding to the amplitude of the wobbling signal or the LPP signal, is used as the control signal generated in the control signal generator 71. Alternatively, signals corresponding to the S/N ratio or the C/N ratio of these signals may also be used as the control signal, and these signals can be measured or generated in internal circuits of the optical disk drive 1. Among signals obtained from marks of the optical disk D, for example, a signal corresponding to the amplitude of the RF signal associated with a largest mark length (14T) may be used as the control signal.

For example, the astigmatism existing in the optical system, including the substrate of the optical disk D, can be corrected by controlling an astigmatism generation element so that the focus position related to a maximum amplitude of the RF signal is equal to or near the focus position related to an optimum quality of the control signal obtained from grooves on the optical disk D.

As the element or method for generating the astigmatism, for example, in the optical pickups shown in FIGS. 12A and 12B, the collimator lens 41 may be set to be movable by the actuator 73 along the optical axis of the laser beam. The control signal generator 71 generates an astigmatism control signal from the focus position and the information signal obtained from the grooves, outputs the control signal to the controller 72, and the controller 72 controls the actuator 73 to move the collimator lens 42 along the direction of the optical axis of the laser beam based on the astigmatism control signal.

In the optical pickup shown in FIG. 14B, the refractive-index variable element 75 may be installed between the light source 41 and the collimator lens 42 in a divergent light path. The control signal generator 71 generates a refractive index control signal from the focus position and the information signal obtained from the grooves and outputs the control signal to the controller 72. The controller 72 controls a voltage applied on the refractive-index variable element 75 based on the refractive index control signal.

In this case, the refractive-index variable element 75 can be made small. In addition, even when the element is installed to be inclined relative to the optical axis, because the aberrations including the astigmatism are corrected together, the requirement of accuracy in setting the optical system is not high.

In the optical pickup shown in FIG. 14A, the refractive-index variable element 75 may be installed in the parallel light path between the beam splitter 43 and the deflecting prism 44 after the collimator lens 42. The control signal generator 71 generates a refractive index control signal from the focus position and the information signal obtained from the grooves and outputs the control signal to the controller 72. The controller 72 controls a voltage applied on the refractive-index variable element 75 based on the refractive index control signal.

In this case, it is easy to add functions for correcting other aberrations, such as, a spherical aberration or a coma aberration. In addition, because the same effect is obtainable no matter where the element 75 is installed in the parallel light path, the freedom of installation is high.

Here, the control signal generator 71 and the controller 72 form the aberration adjustment device of the present invention, and when the control signal generator 71 and the controller 72 are in operation, the reproduction signal extraction unit, and the groove shape signal extraction unit are implemented, as well as the step of acquiring the reproduction signal, and the step of acquiring the groove shape. In addition, the operations in FIG. 24 through FIG. 30 correspond to the focusing unit, the focusing step, the aberration generation unit, the aberration generation step, the aberration adjustment unit, and the aberration adjustment step. The ROM 17 corresponds to the storage medium of the present invention.

Below, descriptions are given of specific operations of the CPU 18 according to the programs stored in ROM 17 for operating the above configurations.

Figure 24:
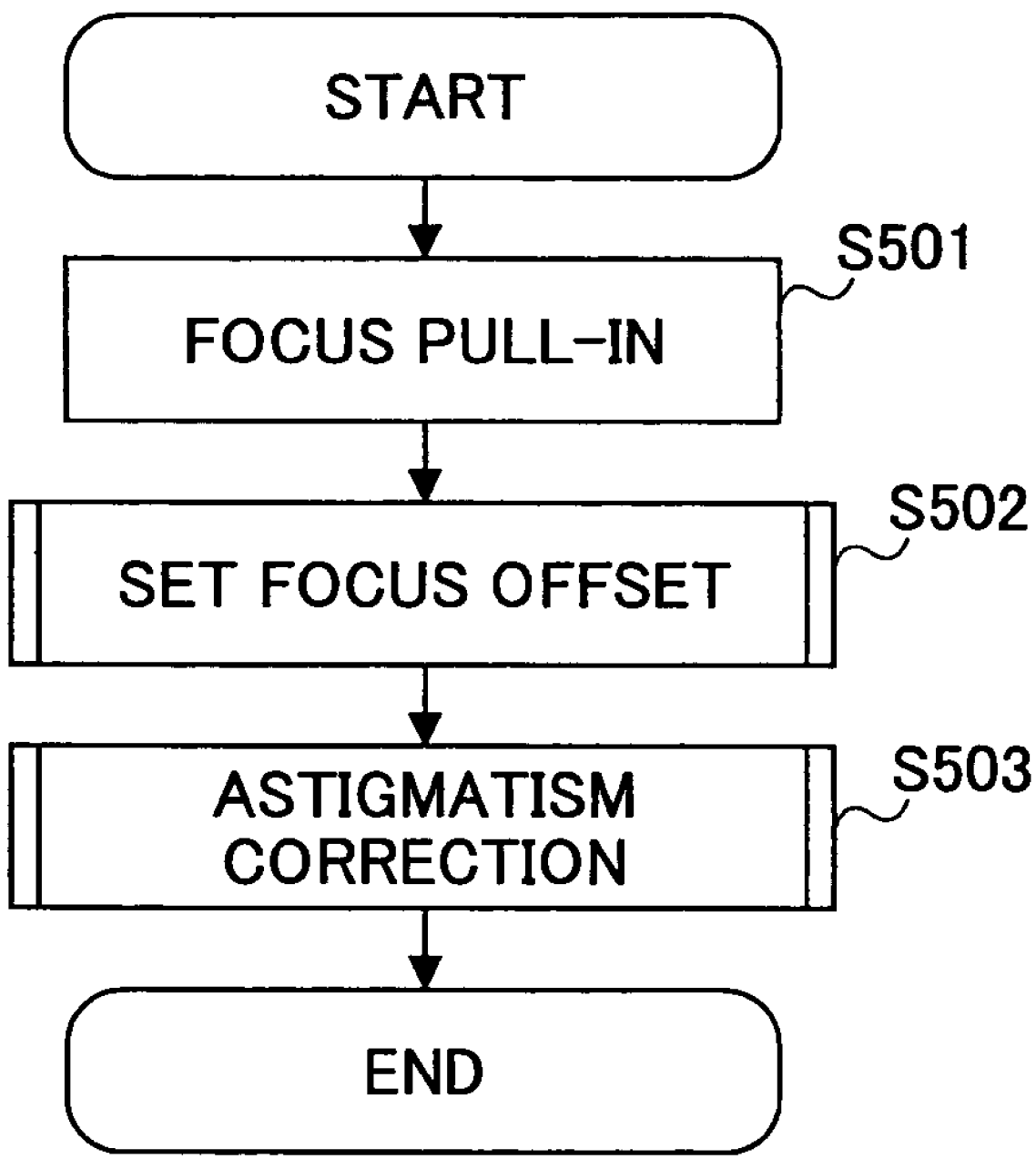
FIG. 24 is a flowchart showing the operation of state-setting according to a second embodiment.

FIG. 24 is a flowchart showing the operation of state-setting according to the present embodiment.

In step S501, the CPU 18 directs the servo unit 6 to operate the actuator 48 to carry out focus pull-in and set the focus servo ON. This step corresponds to the focusing unit of the invention. If the focus pull-in has been finished, this step can be omitted.

In step S502, the CPU 18 starts to set a focus offset. The detail of the focus offset setting is described below with reference to FIG. 25 and FIG. 30.

If correction of the astigmatism is performed without setting the focus offset, step S502 can be omitted.

In step S503, the CPU 18 carries out astigmatism correction. This step corresponds to the aberration generation unit, the aberration generation step, the aberration adjustment unit, and the aberration adjustment step.

The detail of step S503 is described below with reference to FIG. 26 through FIG. 29.

After executing the step S503, the process of state-setting is finished.

By the astigmatism correction in S503, it is possible to improve the detection accuracy of the reproduction signal (that is, the RF signal) and the wobbling signal (WBL), enabling accurate reproduction and recording of data in the optical disk D. In addition, by executing step S102 together, it is possible to further improve the detection accuracy.

Figure 25:
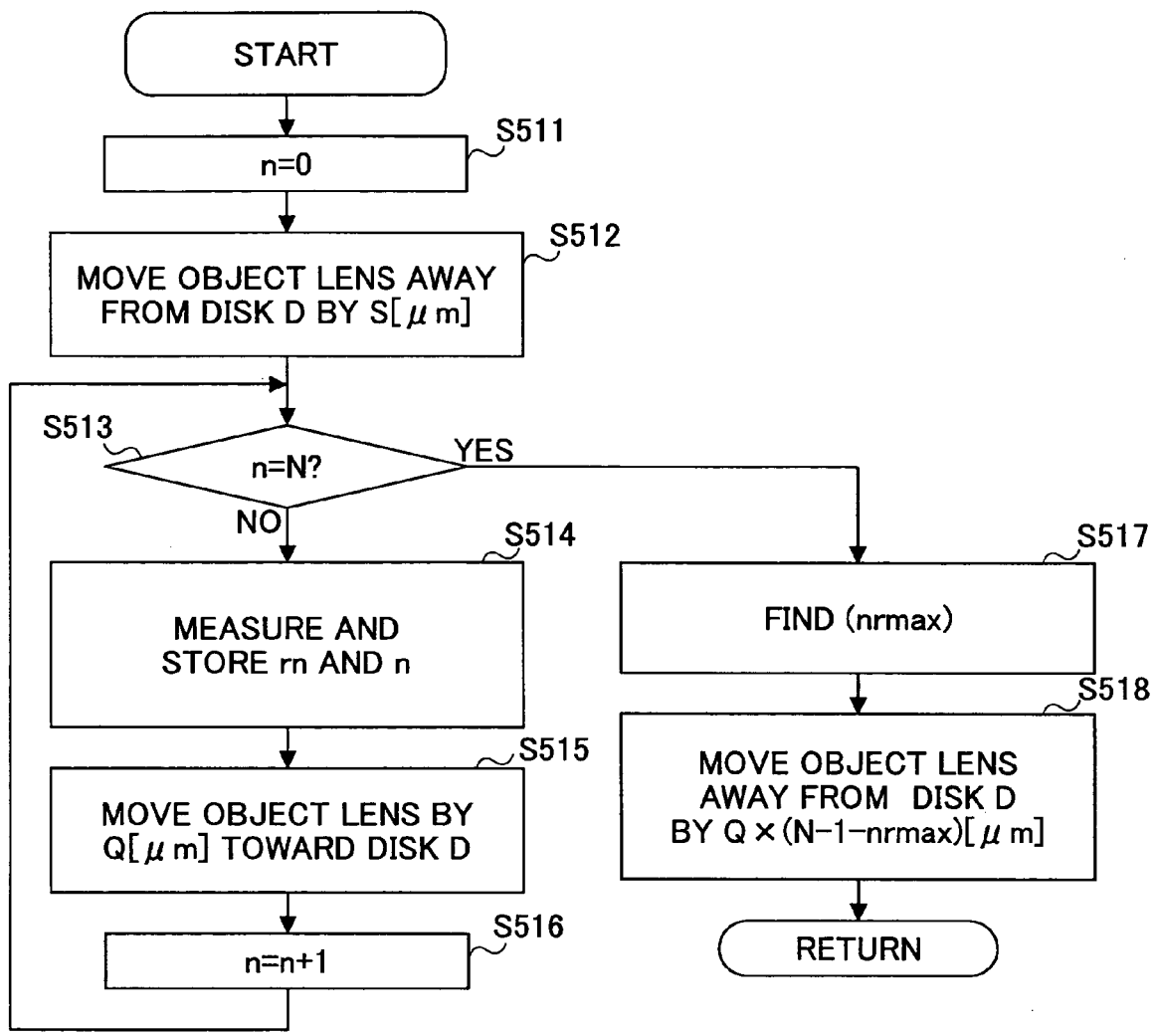
FIG. 25 is a flowchart showing the operation of the focus offset setting process.

FIG. 25 is a flowchart showing an exemplary operation of the focus offset setting process (step S502 in FIG. 24) in the optical disk drive 1 for superposing an offset signal on a focus servo signal so that the focus position of the object lens 45 equals the position where the amplitude of the RF signal is a maximum.

In step S511, the CPU 18 resets a variable n to zero.

In step S512, the CPU 18 directs the servo unit 6 to move the object lens 45 by a distance S [μm] (for example, S=0.5 μm) from the focus position in a focus ON state in the direction away from the optical disk D. In response to the instruction from the CPU 18, the servo unit 6 outputs a signal (a current signal) to the actuator (focus coil) 48 so as to move the object lens 45 by the specified distance S in the direction away from the optical disk D.

In step S513, the CPU 18 determines whether the value of the variable n is equal to a predetermined value N (for example, N=11). Here, the predetermined value N represents the allowed number of times of measuring the amplitude of the RF signal.

If the CPU 18 determines n is not equal to N, the routine proceeds to step S514. If the CPU 18 determines n is equal to N, the routine proceeds to step S517.

In step S514, the CPU 18 directs the peak-hold circuits 913 and 915 to obtain the level rn of the amplitude of the RF signal at the present position of the object lens 45, and stores the level rn of the amplitude of the RF signal in the RAM 19 together with the present value of n.

In this step, it is preferable to maintain the conditions (measurement position, measurement mark length) of executing this step unchanged each time. For example, the amplitude rn of the RF signal can be detected from a mark existing at a predetermined address, or the amplitude rn of the RF signal can be detected in a test region recorded regularly with predetermined mark intervals. In this measurement, it is preferable to use a mark length as large as possible (for example, the largest mark length 14T), because in this case the level of the amplitude of the RF signal is large, and thus it is possible to detect the level of the amplitude of the RF signal with high precision. Alternatively, the predetermined marks may be recorded in the test region before the present processing, and the amplitude rn of the RF signal may be detected based on the recorded marks.

In step S515, the CPU 18 directs the servo unit 6 to move the object lens 45 by a distance Q [μm] (for example, Q=0.1 μm) from the present position of the object lens 45 toward the optical disk D. In response to the instruction of the CPU 18, the servo unit 6 outputs a signal to the actuator (focus coil) 48 so as to move the object lens 45 toward the optical disk D by the specified distance Q [μm].

In step S516, the CPU 18 increases the value of n by one, and then the routine returns to step S513, and steps S513 through S516 are repeatedly executed until the CPU 18 determines that n is equal to N in step S513.

In step S517, the CPU 18 determines the maximum of the measured levels rn of the amplitude of the RF signal stored in the RAM 19, and determines the value of n corresponding to the maximum amplitude of the RF signal. This value of n is denoted to be nrmax.

In step S518, the CPU 18 directs the servo unit 6 to move the object lens 45 by a distance equaling Q(N−1−nrmax) [μm] from the present position in the direction away from the optical disk D. In response to the instruction from the CPU 18, the servo unit 6 outputs a signal to the actuator (focus coil) 48 so as to move the object lens 45 by the specified distance Q(N−1−nrmax) [μm] in the direction away from the optical disk D.

In this way, the object lens 45 is set at the position related to the maximum amplitude of the RF signal. That is, the value of this signal (current signal) corresponds to the value of the focus offset.

After executing the step S518, the process of focus offset setting is finished.

In the procedure shown in FIG. 25, when measuring the amplitude of the RF signal, the object lens 45 is first moved away from the optical disk D, and then is gradually moved towards the optical disk D. But the present embodiment is not limited to this. For example, the object lens 45 may be first moved close to the optical disk D, and then gradually moved away from the optical disk D.

In the optical pickups shown in FIG. 12A and FIG. 12B, when executing the step S502 in FIG. 24, the collimator lens 42 is set at an intermediate position of a reference position (starting position) as described below, and a position farthest from the start position reached by the collimator lens 42 when it is moved.

In the optical pickups shown in FIG. 14A and FIG. 14B, when executing the step S502 in FIG. 24, the voltage applied on the refractive-index variable element 75 is set to be an intermediate value of a reference voltage (starting voltage) and a maximum position applied.

Below, descriptions are given of the procedure of adjusting the astigmatism in optical pickups having configurations shown in FIG. 12A and FIG. 12B, respectively.

Figure 26:
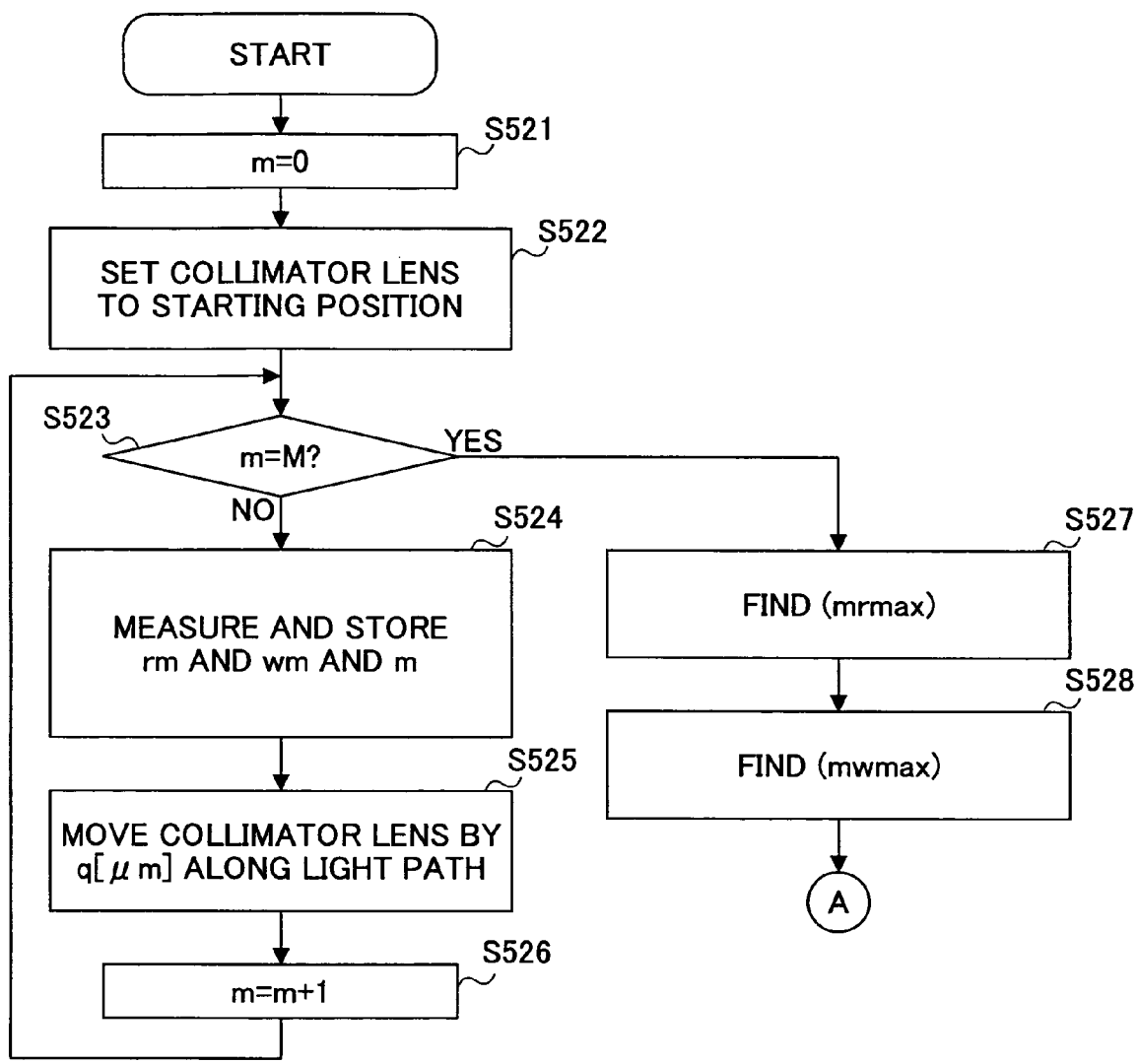
FIG. 26 is a flowchart showing an example of the operation of astigmatism adjustment.
Figure 27:
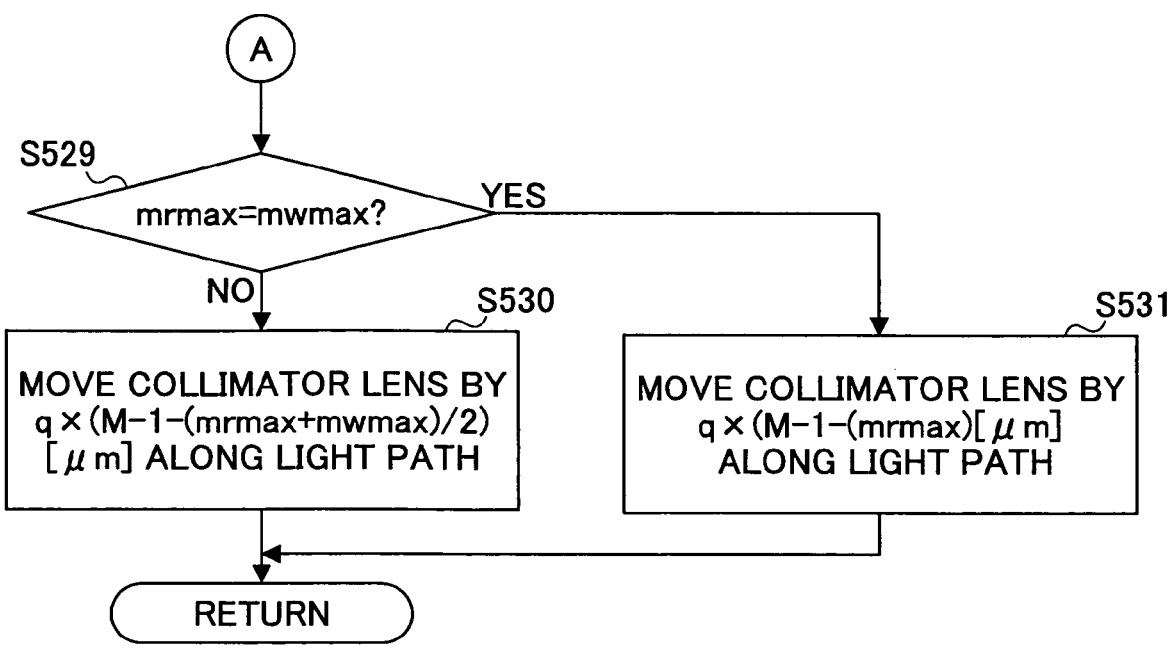
FIG. 27 is a flowchart showing another example of the operation of astigmatism adjustment.

FIG. 26 and FIG. 27 present a flowchart showing an exemplary operation of adjusting the astigmatism (step S503 in FIG. 24). The operations in FIG. 26 and FIG. 27 are executed by the CPU 18 according to the control programs stored in the ROM 17.

In step S521, the CPU 18 initializes a variable m, that is, sets m to zero.

In step S522, the CPU 18 directs the servo unit 6 to move the collimator lens 42 to a predetermined position (starting position).

In response to the instruction from the CPU 18, the servo unit 6 outputs a current signal to the actuator 73 so as to move the collimator lens 42 to the starting position.

In step S523, the CPU 18 determines whether the value of m is equal to a predetermined value M (for example, M=11).

If the CPU 18 determines m is not equal to M, the routine proceeds to step S524. If the CPU 18 determines m is equal to M, the routine proceeds to step S527.

In step S524, the CPU 18 directs the peak-hold circuits 913, 915, 919 and 921 to obtain the level rm of the amplitude of the RF signal, and the level wm of the amplitude of the wobbling signal (or the level of the LPP signal when the optical disk D is a DVD-RW disk or a DVD-R disk) at the present position of the object lens 45, and stores the levels rm, wm of the amplitudes of the RF signal and the wobbling signal (or the level of the LPP signal) in the RAM 19 together with the present value of m.

In this step, it is preferable to maintain the conditions (measurement position, measurement mark length) of executing this step unchanged each time. For example, the amplitude rm of the RF signal and the amplitude wm of the wobbling signal can be detected at predetermined addresses, or the amplitude rm of the RF signal and the amplitude wm of the wobbling signal can be detected in a test region recorded regularly with predetermined mark intervals. In this measurement, it is preferable to use a mark length as large as possible (for example, the largest mark length 14T), because in this case, the level of the amplitude of the RF signal is large, and thus it is possible to detect the amplitude of the RF signal with high precision. Alternatively, predetermined marks may be recorded in the test region before the present processing, and the amplitude rm of the RF signal may be detected based on the recorded marks.

The amplitude wm of the wobbling signal may also be detected in a region having no marks, and in this case, it is possible to obtain a wobbling signal without influence of the RF signal.

In step S525, the CPU 18 directs the servo unit 6 to move the collimator lens 42 along the light path by a certain distance, specifically, the CPU 18 directs the servo unit 6 to move the collimator lens 42 along the light path by a distance q [μm] (for example, q=0.1 μm) in the direction towards the optical disk D. In response to the instruction from the CPU 18, the servo unit 6 outputs a current signal to the actuator 73 so as to move the collimator lens 42 by the specified distance q [μm] along the light path in the direction towards the optical disk D.

In step S526, the CPU 18 increases the value of m by one, and then the routine returns to step S523, and steps S523 through S526 are repeatedly executed until the CPU 18 determines m is equal to M in step S523.

In step S527, the CPU 18 determines the maximum of the measured levels rm of the amplitude of the RF signal stored in the RAM 19, and the value of m corresponding to the maximum amplitude of the RF signal. This value of m is denoted to be mrmax.

In step S528, the CPU 18 determines the maximum of the measured levels wm of the amplitude of the wobbling signal stored in the RAM 19, and the value of m corresponding to the maximum amplitude of the wobbling signal. This value of m is denoted to be mwmax.

In step S529 shown in FIG. 27, the CPU 18 determines whether mrmax is equal to mwmax.

If the CPU 18 determines mrmax is not equal to mwmax, that is, the position of the collimator lens 42 related to the maximum amplitude of the RF signal is different from the position of the collimator lens 42 related to the maximum amplitude of the wobbling signal, the routine proceeds to step S530.

If the CPU 18 determines mrmax is equal to mwmax, that is, the position of the collimator lens 42 related to the maximum amplitude of the RF signal is equal to the position of the collimator lens 42 related to the maximum amplitude of the wobbling signal, the routine proceeds to step S531.

In step S530, the CPU 18 directs the servo unit 6 to move the collimator lens 42 along the light path by a distance of q{M−1−(mrmax+mwmax)/2} [μm] from the present position in a specified direction, for example, in the direction away from the optical disk D.

In response to the instruction from the CPU 18, the servo unit 6 outputs a current signal to the actuator 73 so as to move the collimator lens 42 along the light path by a distance q{M−1−(mrmax+mwmax)/2} [μm] from the present position along the light path in a specified direction, for example, in the direction away from the optical disk D.

Due to this processing, it is possible to set the collimator lens 42 at an intermediate position of the position of the collimator lens 42 related to the maximum amplitude of the RF signal and the position of the collimator lens 42 related to the maximum amplitude of the wobbling signal, and thereby, it is possible to reduce influence of the astigmatism.

In step S531, the CPU 18 directs the servo unit 6 to move the collimator lens 42 along the light path by a distance of q(M−1−mrmax) [μm] from the present position along the light path in a specified direction, for example, in the direction away from the optical disk D.

In response to the instruction from the CPU 18, the servo unit 6 outputs a current signal to the actuator 73 so as to move the collimator lens 42 along the light path by a distance q{M−1−(mrmax+mwmax)} [μm] from the present position along the light path in a specified direction.

In this way, by setting the collimator lens 42 at the position related to the maximum amplitude of the RF signal and the position related to the maximum amplitude of the wobbling signal, it is possible to correct the astigmatism.

When the CPU 18 determines mrmax is not equal to mwmax in step S529, and if it is preferred to emphasize the measurement of the RF signal rather than that of the wobbling signal, the CPU 18 may direct the servo unit 6 to move the collimator lens 42 by a distance q*(M−1−mrmax) [μm] from the present position along the light path in a specified direction to the position where the maximum amplitude of the RF signal is obtained, for example, in the direction away from the semiconductor laser.

Alternatively, the CPU 18 may direct the servo unit 6 to move the collimator lens 42 to a position related to the maximum amplitude of the RF signal even at a position between the position of the collimator lens 42 related to the maximum amplitude of the RF signal and the position of the collimator lens 42 related to the maximum amplitude of the wobbling signal.

If it is preferred to emphasize the measurement of the wobbling signal rather than that of the RF signal, the CPU 18 may direct the servo unit 6 to move the collimator lens 42 by a distance q*(M−1−mwmax) [μm] from the present position along the light path in a specified direction to the position where the maximum amplitude of the wobbling signal is obtained, for example, in the direction away from the semiconductor laser.

Alternatively, the CPU 18 may direct the servo unit 6 to move the collimator lens 42 to a position related to the maximum amplitude of the wobbling signal even at a position between the position of the collimator lens 42 related to the maximum amplitude of the RF signal and the position of the collimator lens 42 related to the maximum amplitude of the wobbling signal.

In this way, the astigmatism is corrected, and the procedure in FIG. 26 and FIG. 27 is completed.

Below, descriptions are given of the procedure of adjusting the astigmatism in optical pickups having configurations shown in FIG. 14A and FIG. 14B, respectively.

Figure 28:
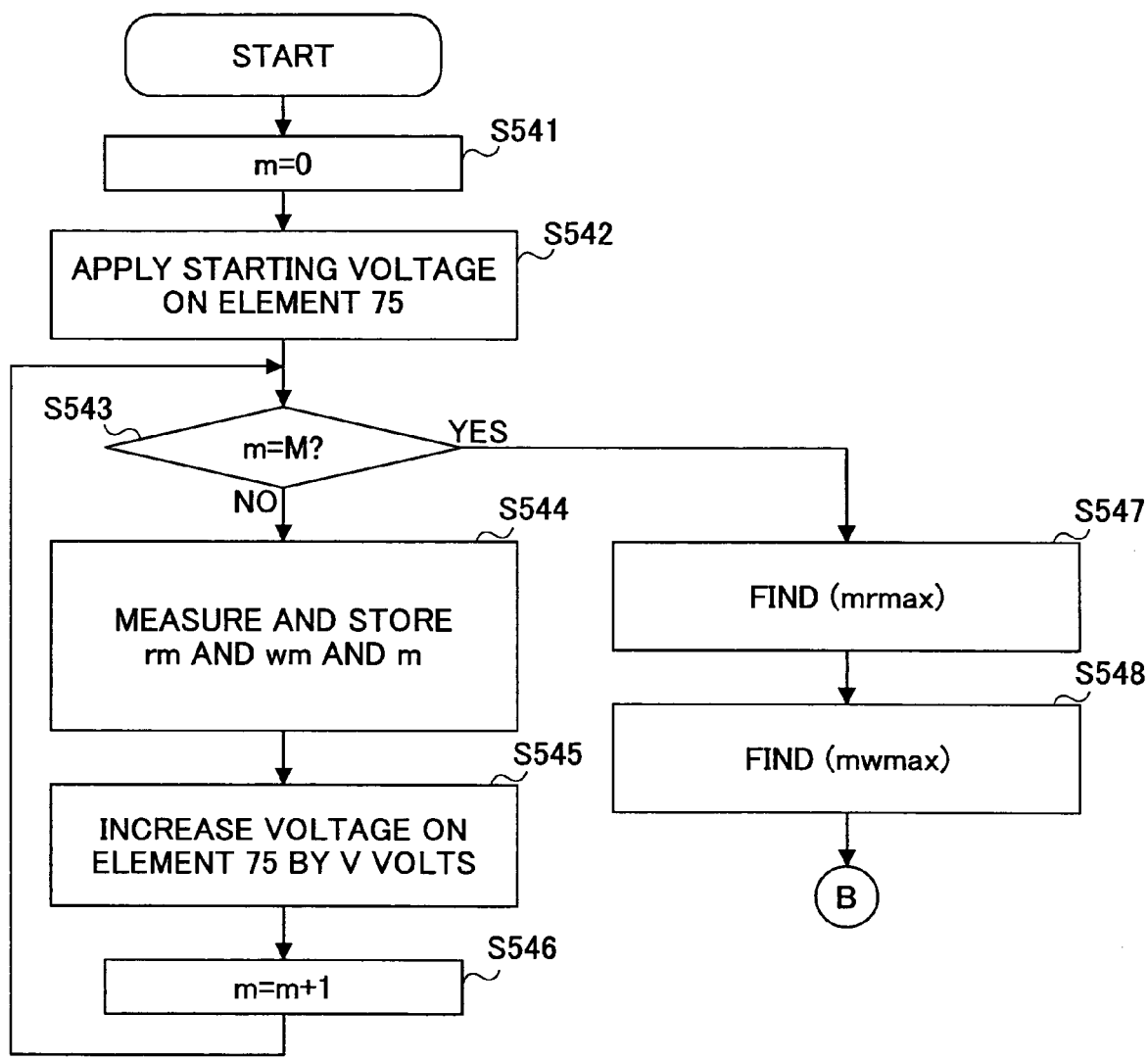
FIG. 28 is a flowchart showing another example of the operation of astigmatism adjustment.
Figure 29:
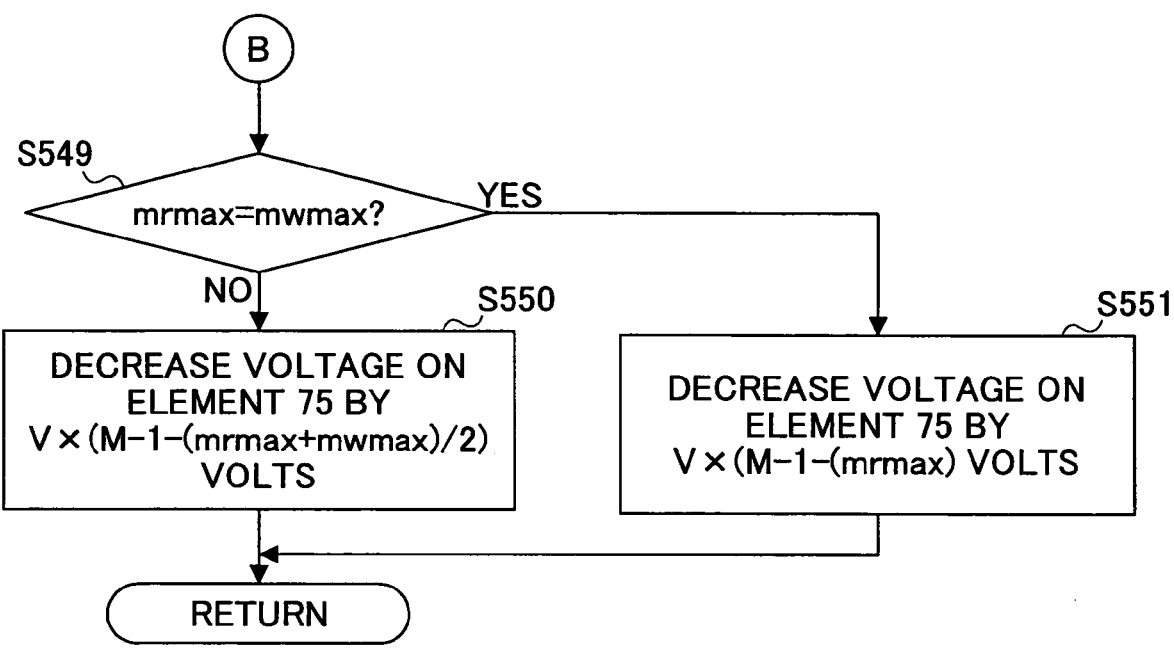
FIG. 29 is a flowchart showing another example of the operation of astigmatism adjustment.

FIG. 28 and FIG. 29 present a flowchart showing an exemplary operation of adjusting the astigmatism (step S503 in FIG. 24). The operations in FIG. 26 and FIG. 27 are executed by the CPU 18 according to the control programs stored in the ROM 17.

In step S541, the CPU 18 initializes a variable m, that is, sets m to zero.

In step S542, the CPU 18 directs the servo unit 6 to apply a reference voltage (starting voltage) on the refractive-index variable element 75. In response to the instruction from the CPU 18, the servo unit 6 applies the starting voltage on the refractive-index variable element 75.

In step S543, the CPU 18 determines whether the value of m is equal to a predetermined value M (for example, M=11).

If the CPU 18 determines m is not equal to M, the routine proceeds to step S544. If the CPU 18 determines m is equal to M, the routine proceeds to step S547.

In step S544, the CPU 18 directs the peak-hold circuits 913, 915, 919 and 921 to obtain the level rm of the amplitude of the RF signal, and the level wm of the amplitude of the wobbling signal (or the level of the LPP signal when the optical disk D is a DVD-RW disk or a DVD-R disk) with the present voltage being applied on the refractive-index variable element 75, and stores the levels rm, wm of the amplitudes of the RF signal and the wobbling signal (or the level of the LPP signal) in the RAM 19 together with the present value of m.

In this step, it is preferable to maintain the conditions (measurement position, measurement mark length) of executing this step unchanged each time. For example, the amplitude rm of the RF signal and the amplitude wm of the wobbling signal can be detected at predetermined addresses, or the amplitude rm of the RF signal and the amplitude wm of the wobbling signal can be detected in a test region recorded regularly with predetermined mark intervals. In this measurement, it is preferable to use a mark length as large as possible (for example, the largest mark length 14T), because in this case, the level of the amplitude of the RF signal is large, and thus it is possible to detect the amplitude of the RF signal with high precision. Alternatively, predetermined marks may be recorded in the test region before the present processing, and the amplitude rm of the RF signal may be detected based on the recorded marks.

The amplitude wm of the wobbling signal may also be detected in a region having no marks, and in this case, it is possible to obtain a wobbling signal without influence of the RF signal.

In step S545, the CPU 18 directs the servo unit 6 to increase the voltage presently applied on the refractive-index variable element 75 by v volts. In response to the instruction from the CPU 18, the servo unit 6 applies a voltage increased by v volts on the refractive-index variable element 75.

In step S546, the CPU 18 increases the value of m by one, and then the routine returns to step S543, and steps S543 through S546 are repeatedly executed until the CPU 18 determines m is equal to M in step S543.

In step S547, the CPU 18 determines the maximum of the measured levels rm of the amplitude of the RF signal stored in the RAM 19, and the value of m corresponding to the maximum amplitude of the RF signal. This value of m is denoted to be mrmax.

In step S548, the CPU 18 determines the maximum of the measured levels wm of the amplitude of the wobbling signal stored in the RAM 19, and the value of m corresponding to the maximum amplitude of the wobbling signal. This value of m is denoted to be mwmax.

In step S549 shown in FIG. 29, the CPU 18 determines whether mrmax is equal to mwmax.

If the CPU 18 determines mrmax is not equal to mwmax, that is, the voltage resulting in the maximum amplitude of the RF signal is different from the voltage resulting in the maximum amplitude of the wobbling signal, the routine proceeds to step S550.

If the CPU 18 determines mrmax is equal to mwmax, that is, the voltage resulting in the maximum amplitude of the RF signal is equal to the voltage resulting in the maximum amplitude of the wobbling signal, the routine proceeds to step S551.

In step S550, the CPU 18 directs the servo unit 6 to decrease the voltage presently applied on the refractive-index variable element 75 by $V\{M-1-(mrmax+mwmax)/2\}$ volts. In response to the instruction from the CPU 18, the servo unit 6 reduces the voltage applied on the refractive-index variable element 75 by the specified quantity.

Due to this processing, it is possible to set an intermediate voltage between the voltage resulting in the maximum amplitude of the RF signal and the voltage resulting in the maximum amplitude of the wobbling signal, and thereby, it is possible to reduce influence of the astigmatism.

In step S551, the CPU 18 directs the servo unit 6 to decrease the voltage presently applied on the refractive-index variable element 75 by V(M−1−mrmax) volts. In response to the instruction from the CPU 18, the servo unit 6 reduces the voltage applied on the refractive-index variable element 75 by the specified quantity.

In this way, the voltage is set to result in maximum amplitude of the RF signal and maximum amplitude of the wobbling signal, and therefore, it is possible to correct the astigmatism.

When the CPU 18 determines mrmax is not equal to mwmax in step S539, and if it is preferred to emphasize the measurement of the RF signal rather than that of the wobbling signal, the CPU 18 may direct the servo unit 6 to reduce the present voltage by V(M−1−mrmax) volts.

Alternatively, the CPU 18 may direct the servo unit 6 to apply a voltage on the refractive-index variable element 75 near the voltage resulting in the maximum amplitude of the RF signal in a voltage range between a voltage resulting in the maximum amplitude of the RF signal and a voltage resulting in the maximum amplitude of the wobbling signal.

If it is preferred to emphasize the measurement of the wobbling signal rather than that of the RF signal, the CPU 18 may direct the servo unit 6 to reduce the present voltage by V(M−1−mwmax) volts.

Alternatively, the CPU 18 may direct the servo unit 6 to apply a voltage on the refractive-index variable element 75 near the voltage resulting in the maximum amplitude of the wobbling signal in a voltage range between a voltage resulting in the maximum amplitude of the RF signal and a voltage resulting in the maximum amplitude of the wobbling signal.

In this way, the astigmatism is corrected, and the procedure in FIG. 28 and FIG. 29 is completed.

Figure 30:
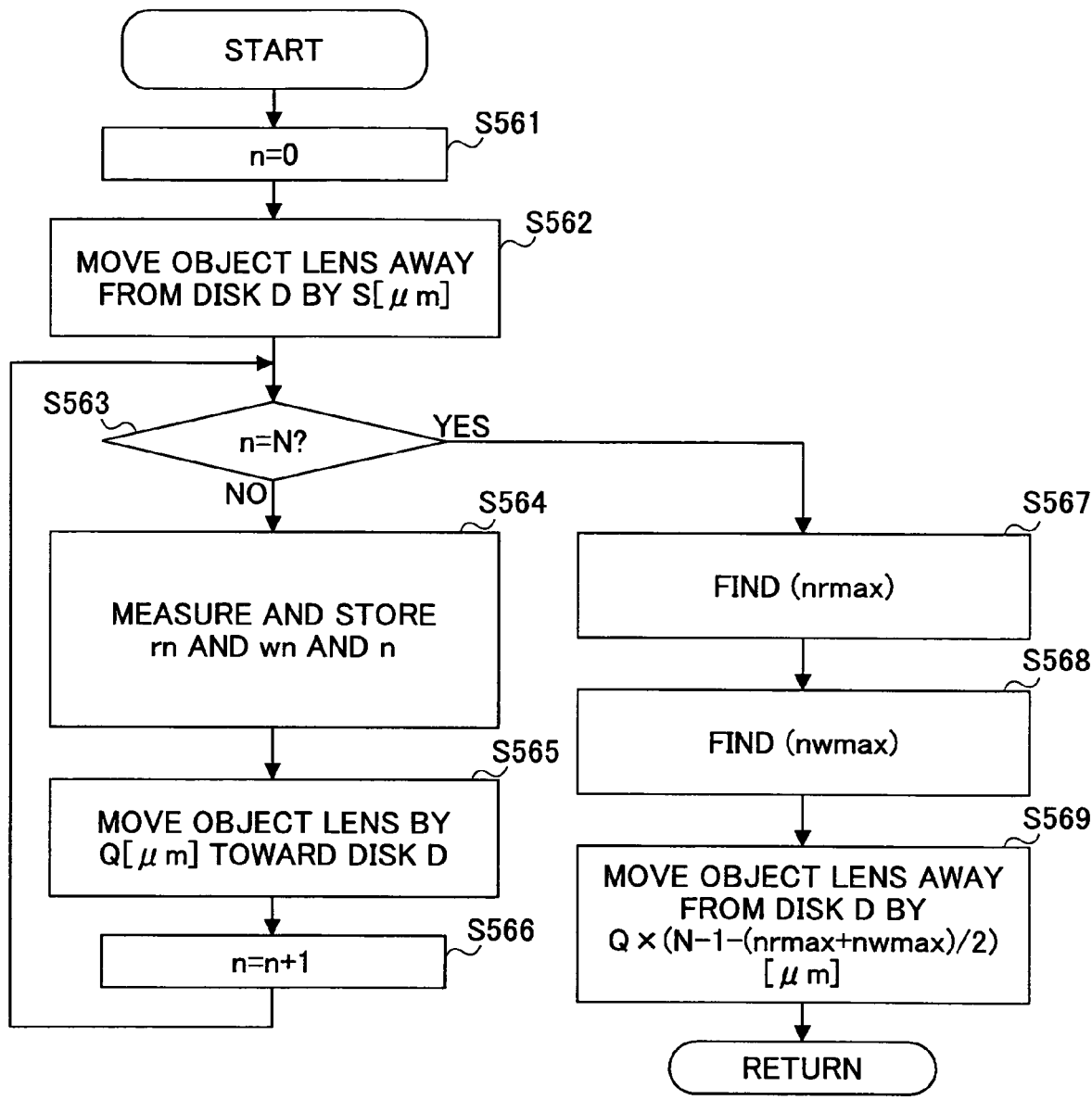
FIG. 30 is a flowchart showing another example of the operation of the focus offset setting process.

FIG. 30 is a flowchart showing another example of the operation of the focus offset setting process (step S502 in FIG. 24) for superposing an offset signal on a focus servo signal so that the focus position of the object lens 45 equals the position where the amplitude of the wobbling signal is a maximum. The operations in FIG. 30 are executed by the CPU 18 according to the control programs stored in the ROM 17.

In step S561, the CPU 18 resets a variable n to zero.

In step S562, the CPU 18 directs the servo unit 6 to move the object lens 45 by a distance S [μm] (for example, S=0.5 μm) from the focus position in a focus ON state in the direction away from the optical disk D.

In response to the instruction from the CPU 18, the servo unit 6 outputs a signal (a current signal) to the actuator (focus coil) 48 so as to move the object lens 45 by the specified distance S in the direction away from the optical disk D.

In step S563, the CPU 18 determines whether the value of the variable n is equal to a predetermined value N (for example, N=11). Here, the predetermined value N represents the allowed number of times of measuring the amplitude of the RF signal.

If the CPU 18 determines n is not equal to N, the routine proceeds to step S564. If the CPU 18 determines n is equal to N, the routine proceeds to step S567.

In step S564, the CPU 18 directs the peak-hold circuits 913, 915, 919, 921 to obtain the level rn of the amplitude of the RF signal, and the level wn of the amplitude of the wobbling signal (or the level of the LPP signal when the optical disk D is a DVD-RW disk or a DVD-R disk) at the present position of the object lens 45, and stores the levels rn, wn of the amplitudes of the RF signal and the wobbling signal (or the level of the LPP signal) in the RAM 19 together with the present value of n.

In this step, it is preferable to maintain the conditions (measurement position, measurement mark length) of executing this step unchanged each time. For example, the amplitude rn of the RF signal and the amplitude wn of the wobbling signal can be detected at predetermined addresses, or the amplitude rn of the RF signal and the amplitude wn of the wobbling signal can be detected in a test region recorded regularly with predetermined mark intervals. In this measurement, it is preferable to use a mark length as large as possible (for example, the largest mark length 14T), because in this case, the level of the amplitude of the RF signal is large, and thus it is possible to detect the amplitude of the RF signal with high precision. Alternatively, predetermined marks may be recorded in the test region before the present processing, and the amplitude rn of the RF signal may be detected based on the recorded marks.

The amplitude wn of the wobbling signal may also be detected in a region having no marks, and in this case, it is possible to obtain a wobbling signal without influence of the RF signal.

In step S565, the CPU 18 directs the servo unit 6 to move the object lens 45 by a distance Q [μm] (for example, Q=0.1 μm) from the present position of the object lens 45 toward the optical disk D. In response to the instruction, the servo unit 6 outputs a signal to the actuator (focus coil) 48 so as to move the object lens 45 by the specified distance Q [μm].

In step S566, the CPU 18 increases the value of n by one, and then the routine returns to step S563, and steps S563 through S566 are repeatedly executed until the CPU 18 determines n is equal to N in step S563.

In step S567, the CPU 18 determines the maximum of the measured levels rn of the amplitude of the RF signal stored in the RAM 19, and the value of n corresponding to the maximum amplitude of the RF signal. This value of n is denoted to be nrmax.

In step S568, the CPU 18 determines the maximum of the measured levels wn of the amplitude of the wobbling signal stored in the RAM 19, and the value of n corresponding to the maximum amplitude of the wobbling signal. This value of n is denoted to be nwmax.

In step S569, the CPU 18 directs the servo unit 6 to move the object lens 45 by a distance equaling Q{N−1−(nrmax+nwmax)/2} [μm] from the present position in the direction away from the optical disk D. In response to the instruction from the CPU 18, the servo unit 6 outputs a signal to the actuator (focus coil) 48 so as to move the object lens 45 by the specified distance Q{N−1−(nrmax+nwmax)/2} [μm].

In other words, the object lens 45 is moved to an intermediate position of the position where the amplitude of the RF signal is a maximum and a position where the amplitude of the wobbling signal is a maximum. The value of this signal (current signal) corresponds to the value of the focus offset. After executing the step S569, the process of focus offset setting is finished.

In the operations in FIG. 30, when measuring the amplitudes of the RF signal and the wobbling signal, the object lens 45 is first moved away from the optical disk D, and then is gradually moved towards the optical disk D. But the present embodiment is not limited to this method. For example, the object lens 45 may be first moved close to the optical disk D, and then gradually moved away from the optical disk D.

In the operations shown in FIG. 24 through FIG. 30, the maximum amplitudes of the RF signal and the wobbling signal may be obtained by approximation calculations or interpolation calculations, and the object lens, or the collimator lens are moved, or the voltage applied on the refractive-index variable element is adjusted, so that the amplitudes of the RF signal and the wobbling signal become the calculated value of the maximums.

By performing the control procedure described above before the operation of recording data in the optical disk D in the optical disk drive 1, it is possible to reduce influences of astigmatism caused by misalignment of the optical system generated from temperature rising in the optical disk drive 1 before data recording.

In addition, by performing the control procedure described above after the operation of recording data in the optical disk D, it is possible to reduce influences of astigmatism caused by misalignment of the optical system generated from temperature rising in the optical disk drive 1 due to the recording operation.

In addition, by performing the control procedure described above in successive recording operations at specified time intervals, for example, once every five minutes, or once each time 1000 tracks are recorded, it is possible to reduce influences of astigmatism caused by misalignment of the optical system generated from a temperature rising in the optical disk drive 1 due to the recording operation.

In addition, by performing the control procedure described above at specified positions, for example, 30 mm, or 40 mm, or 50 mm from the center of the optical disk D, it is possible to reduce influences of astigmatism caused by intrinsic bending of the optical disk D.

According to the present invention, in order to suppress degradation of the C/N (S/N) ratio, an astigmatism generation unit is provided in the light path from the light source to an optical device, and is controlled by using a control signal generated from a signal obtained from grooves on the optical recording medium and an information signal to change the characteristic of the light spot of a light beam emitted onto an optical recording medium. As a result, it is possible to maintain an appropriate S/N ratio for both the signal obtained from the grooves and the information signal even when astigmatism exists in the light spot, thereby improving reliability of the optical disk drive.

When using a refractive-index variable element as the astigmatism generation element, it is possible to arrange the element in the optical system without a driving mechanism, thereby improving reliability of the optical disk drive.

When using a common device as the astigmatism generation element, it is possible to improve control stability and reliability of the optical disk drive, and reduce the cost of the optical disk drive.

When a liquid crystal element having a parallel plate configuration is used as the astigmatism generation element, by making the electrode pattern of the liquid crystal element a simple plane, it is possible to reduce the cost of the liquid crystal element, and reduce the requirement of accuracy of setting the liquid crystal element.

Because control is performed to maintain an appropriate S/N ratio for both the signal obtained from the grooves and the information signal against changes of the astigmatism due to uncertainty occurring when assembling optical parts in the optical pickup 3, or due to change of characteristics of the optical pickup 3 with time or temperature, it is possible to improve reliability of the system.

According to the present invention, it is possible to maintain an appropriate S/N ratio for both the signal obtained from the grooves and the information signal even when astigmatism, spherical aberrations, or other aberrations exist in the light spot of a light beam emitted onto an optical recording medium.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

In the above embodiments, in addition to the examples mentioned above, an electrical optical element formed from a solid crystal element may also be used as the refractive-index variable element.

The above-mentioned embodiments are particularly related to corrections of spherical aberrations or astigmatism. But the present invention is not limited to these kinds of aberrations. It can be used to reduce influence of any other kinds of aberrations existing in the optical system, for example, the coma aberration, distortion, curvature of field, that is, the so-called Seidel's five aberrations.

What is claimed is:

1. An optical pickup that includes an aberration adjustment device for adjusting an aberration related to light emitted from a light source, and records or reproduces data in an optical information recording medium having a guiding groove by using the light adjusted by the aberration adjustment device, wherein the aberration adjustment device includes:

an aberration generation element configured to generate a correction aberration on the light emitted from the light source;

a control signal generator configured to extract a reproduction signal from light reflected from the optical information recording medium, and configured to extract a signal corresponding to a shape of the guiding groove from light reflected from the optical information recording medium, the signal corresponding to the shape of the guiding groove being separate from the reproduction signal and the signals being detected at predetermined addresses of the optical information recording medium; and wherein the aberration adjustment device is configured to adjust the correction aberration generated by the aberration generation element based on the reproduction signal and the signal corresponding to the shape of the guiding groove, to thereby adjust for astigmatism in the optical pickup.

2. The optical pickup of claim 1, wherein the optical pickup includes multiple photodetector regions, for generating first and second signals, and wherein the control signal generator is configured such that the signal corresponding to the shape of the guiding groove corresponds to a difference between the first and second signals.

3. The optical pickup of claim 2, further comprising a circuit element for inputting the signal corresponding to the shape of the guiding groove to an address detection circuit.

4. The optical pickup of claim 3, further comprising a circuit element for inputting the reproduction signal to a DVD decoder.

5. An optical information recording apparatus comprising an aberration adjustment device for adjusting an aberration related to light emitted from a light source, said optical information recording apparatus recording or reproducing data in an optical information recording medium having a guiding groove by using the light adjusted by the aberration adjustment device, wherein the aberration adjustment device includes:

an aberration generation element configured to generate a correction aberration on the light emitted from the light source;

a control signal generator configured to extract a reproduction signal from light reflected from the optical information recording medium and wherein the control signal generator is configured to extract a signal corresponding to a shape of the guiding groove from light reflected from the optical information recording medium, and wherein the control signal generator is configured such that the reproduction signal corresponds to information recorded at a predetermined address on the optical information recording medium, other than the shape of the guiding groove; and wherein said aberration correction device is configured to adjust the correction aberration generated by the aberration generation element based on the reproduction signal and the signal corresponding to the shape of the guiding groove, to thereby adjust for astigmatism in the recording apparatus.

6. The apparatus of claim 5, further comprising multiple photodetector regions for generating first and second signals, and wherein the control signal generator is configured such that the signal corresponding to the shape of the guiding groove corresponds to a difference between the first and second signals.

7. The apparatus of claim 6, further comprising a circuit element for inputting the signal corresponding to the shape of the guiding groove to an address detection circuit.

8. The apparatus of claim 7, further comprising a DVD decoder, and a circuit element for inputting the reproduction signal to the DVD decoder.

9. A storage medium that stores a program executable in a computer for executing an optical information recording apparatus so as to adjust an aberration related to light emitted from a light source and record or reproduce data in an optical information recording medium having a guiding groove by using the aberration-adjusted light, said program executing the optical information recording apparatus to operate:
- an aberration generation element configured to generate a correction aberration on the light emitted from the light source;
- a control signal generator configured to extract a reproduction signal from light reflected from a test region of the optical information recording medium having predetermined mark intervals and to extract a signal corresponding to a shape of the guiding groove from light reflected from the optical information recording medium, and wherein the control signal generator is configured such that the reproduction signal corresponds to information recorded on the optical information recording medium, other than the shape of the guiding groove; and
- the optical information recording apparatus to adjust the correction aberration generated by the aberration generation element based on the reproduction signal and the signal corresponding to the shape of the guiding groove, and wherein the adjustment includes adjusting for astigmatism in the recording apparatus by adding spherical aberration to the light emitted from the light source.

10. The storage medium of claim 9, wherein the program executes the apparatus such that the signal corresponding to the shape of the guiding groove corresponds to a difference between first and second signals, based on multiple photodetector regions.

11. The storage medium of claim 10, wherein the program executes the apparatus such that a circuit element inputs the signal corresponding to the shape of the guiding groove to an address detection circuit.

12. The storage medium of claim 11, wherein the program executes the apparatus such that a circuit element inputs the reproduction signal to a DVD decoder.

13. A method for adjusting an aberration related to light emitted from a light source, comprising the steps of:
- generating a correction aberration on the light;
- extracting a reproduction signal from light reflected from a predetermined address on an optical information recording medium having a guiding groove;
- extracting a signal corresponding to a shape of the guiding groove from light reflected from a predetermined address on the optical information recording medium; and
- adjusting the correction aberration based on the reproduction signal and the signal corresponding to the shape of the guiding groove, and wherein the adjusting step includes adjusting for astigmatism by adding spherical aberration to the light emitted from the light source.

14. The method of claim 13, wherein the step of extracting the signal corresponding to the shape of the guiding groove includes the step of subtracting one signal from another.

15. The method of claim 14, further comprising the step of extracting the amplitude of a wobble signal, and wherein the step of extracting the amplitude is performed subsequent to the step of subtracting.

16. The method of claim 14, further comprising the step of extracting the amplitude of a pre-pit signal, and wherein the step of extracting the amplitude is performed subsequent to the step of subtracting.

17. The method of claim 13, further comprising the step of inputting the signal corresponding to the shape of the guiding groove to an address detection circuit.

18. The method of claim 13, further comprising the step of inputting the reproduction signal to a decoder.

19. The method of claim 13, further comprising the step of extracting the amplitude of a wobble signal.

20. The method of claim 13, further comprising the step of extracting the amplitude of a pre-pit signal.

21. A method for adjusting an aberration related to light emitted from a light source, comprising:
- setting the focus offset in an optical disk drive; and
- generating a correction aberration on the light;
- extracting a reproduction signal from light reflected from a predetermined address on an optical information recording medium having a guiding groove;
- extracting a signal corresponding to a shape of the guiding groove from light reflected from a predetermined address on the optical information recording medium; and
- adjusting the correction aberration based on the reproduction signal and the signal corresponding to the shape of the guiding groove, wherein the setting the focus offset step further comprises:
- obtaining an amplitude of the reproduction signal at a given position of an object lens;
- moving the object lens by a distance Q toward an optical disk;
- determining a maximum amplitude of the reproduction signal (nrmax); and
- moving the object lens by a distance Q(N−1−nrmax) in a direction away from the optical disk, and
- wherein the adjusting step includes adjusting for astigmatism.

22. The method of claim 21, wherein the step for adjusting for astigmatism further comprises:
- moving a collimator lens along a light path by a distance q in a direction towards the optical disk;
- determining the maximum amplitude of the reproduction signal (mrmax) and the signal corresponding to the shape of the guiding groove (mwmax); and
- moving the collimator lens along the light path by a distance q{M−1−(mrmax+mwmax)/2} in a direction away from the optical disk.

23. The method of claim 21, wherein the step for adjusting for astigmatism further comprises:
- moving a collimator lens along a light path by a distance q in a direction towards the optical disk;
- determining the maximum amplitude of the reproduction signal (mrmax); and
- moving the collimator lens along the light path by a distance q{M−1−mrmax} in a direction away from the optical disk.

24. The method of claim 21, wherein the step for adjusting for astigmatism further comprises:
- moving a collimator lens along a light path by a distance q in a direction towards the optical disk;
- determining the maximum amplitude of the signal corresponding to the shape of the guiding groove (mwmax); and
- moving the collimator lens along the light path by a distance q{M−1−mwmax} in a direction away from the optical disk.

* * * * *